(12) United States Patent
Windisch

(10) Patent No.: US 11,661,183 B2
(45) Date of Patent: May 30, 2023

(54) SMALL LIGHT VERTICAL TAKE-OFF AND LANDING CAPABLE DELTA WING AIRCRAFT

(71) Applicant: D. Anthony Windisch, Edmond, OK (US)

(72) Inventor: D. Anthony Windisch, Edmond, OK (US)

(*) Notice: Subject to any disclaimer, the term of this patent is extended or adjusted under 35 U.S.C. 154(b) by 59 days.

(21) Appl. No.: 17/203,413

(22) Filed: Mar. 16, 2021

(65) Prior Publication Data

US 2021/0284333 A1 Sep. 16, 2021

Related U.S. Application Data

(60) Provisional application No. 62/990,311, filed on Mar. 16, 2020.

(51) Int. Cl.
*F04D 19/00* (2006.01)
*B64C 29/00* (2006.01)
(Continued)

(52) U.S. Cl.
CPC ........ *B64C 29/0066* (2013.01); *B64C 13/503* (2013.01); *F04D 19/007* (2013.01); *F04D 29/563* (2013.01)

(58) Field of Classification Search
CPC ............ B64C 29/0066; B64C 29/0025; B64C 13/503; B64C 13/0423; B64C 13/044;
(Continued)

(56) References Cited

U.S. PATENT DOCUMENTS

| 2,716,460 A | 8/1955 | Young |
| 2,840,324 A | 6/1958 | Smith |

(Continued)

FOREIGN PATENT DOCUMENTS

| EP | 3650637 A1 * | 5/2020 | ............ F01D 17/14 |
| GB | G8567072 | 1/1945 | |

(Continued)

OTHER PUBLICATIONS

Gorham, John A., "R/C VTOL Makes History", Model Airplane News, 1993, p. 38, vol. 121, No. 10, Publisher: Air Age, Inc.

(Continued)

*Primary Examiner* — David E Sosnowski
*Assistant Examiner* — Wayne A Lambert
(74) *Attorney, Agent, or Firm* — James F. Lea, III; Gable Gotwals

(57) ABSTRACT

An aircraft having a frame assembly that supports a compressor having an outer shell that defines front and rear nozzle ports with rotatable nozzles for selectable vertical or horizontal thrust. The inner shell and the outer shell define an intake gap therebetween such as an annulus. A first fan unit within the inner shell and is configured to exhaust air through the front nozzle ports. A second fan unit within the outer shell intakes air through the intake gap and exhausts air through the rear nozzle ports. The fan units are preferably connected to one another via a drive shaft that is surrounded by a streamlining tube. The fan units each include a plurality of fans having stators therebetween. The stators have a plurality of stator arms with a wing structure pivotally attached to the trailing edge for angling air flow from a front to a rear fan.

12 Claims, 32 Drawing Sheets

(51) Int. Cl.
*B64C 13/50* (2006.01)
*F04D 29/56* (2006.01)

(58) Field of Classification Search
CPC ......... B64C 1/061; B64C 25/34; B64C 25/62; B64C 39/12; F04D 19/007; F04D 19/02; F04D 29/563; B64D 31/04; B64D 31/14
See application file for complete search history.

(56) References Cited

U.S. PATENT DOCUMENTS

| | | | |
|---|---|---|---|
| 2,912,188 A | 11/1958 | Singelmann et al. | |
| 2,932,468 A * | 4/1960 | Gottfried | B64C 29/0066 D12/330 |
| 2,956,732 A * | 10/1960 | Stalker | F04D 27/0215 415/181 |
| 2,961,198 A | 11/1960 | Stevens | |
| 3,054,577 A | 9/1962 | Wolf et al. | |
| 3,056,258 A | 10/1962 | Marchant et al. | |
| 3,073,548 A | 1/1963 | Marsh | |
| 3,088,275 A | 5/1963 | Marchant et al. | |
| 3,117,750 A | 1/1964 | Snell | |
| 3,135,480 A * | 6/1964 | Chaplin, Jr. | B60V 1/08 180/122 |
| 3,154,917 A | 11/1964 | Williamson | |
| 3,184,337 A | 1/1965 | Hooper | |
| 3,190,584 A | 6/1965 | Gire et al. | |
| 3,191,886 A | 6/1965 | Lewis et al. | |
| 3,209,535 A | 10/1965 | Marchant et al. | |
| 3,226,032 A | 12/1965 | Kurti | |
| 3,266,245 A | 8/1966 | Mullins | |
| 3,318,095 A | 5/1967 | Snell | |
| 3,451,644 A | 6/1969 | Marchetti et al. | |
| 3,528,247 A | 9/1970 | Riemerschmid | |
| 3,893,638 A | 7/1975 | Kelley | |
| 4,044,971 A * | 8/1977 | Pharris | B64C 29/0025 416/61 |
| 4,151,714 A | 5/1979 | Scrace | |
| 4,343,446 A | 8/1982 | Langley | |
| 4,474,345 A | 10/1984 | Musgrove | |
| 4,519,543 A | 5/1985 | Szuminski et al. | |
| 4,550,877 A | 11/1985 | Szuminski | |
| 4,552,309 A | 11/1985 | Szuminski et al. | |
| 4,587,803 A | 5/1986 | Nightingale et al. | |
| 4,679,732 A | 7/1987 | Woodward | |
| 4,782,657 A | 11/1988 | Lewis et al. | |
| 4,850,535 A | 7/1989 | Ivie | |
| 5,082,181 A | 1/1992 | Brees et al. | |
| 5,161,741 A | 11/1992 | Seyfang | |
| 5,209,428 A | 5/1993 | Bevilaqua et al. | |
| 5,297,388 A | 3/1994 | Nightingale | |
| 5,383,332 A | 1/1995 | Angel | |
| 5,390,877 A | 2/1995 | Nightingale | |
| 5,454,175 A | 11/1995 | Short | |
| 5,507,453 A | 4/1996 | Shapery | |
| 5,666,803 A | 9/1997 | Windisch | |
| 5,708,650 A | 1/1998 | Thayer | |
| 5,720,453 A | 2/1998 | Platt | |
| 5,769,317 A | 6/1998 | Sokhey et al. | |
| 5,803,199 A | 9/1998 | Walter | |
| 5,820,024 A | 10/1998 | Ausdenmoore et al. | |
| 6,105,901 A | 8/2000 | Ulanoski et al. | |
| 6,170,776 B1 | 1/2001 | Cycon et al. | |
| 6,260,800 B1 * | 7/2001 | Snell | B64C 3/50 60/226.3 |
| 6,269,627 B1 | 8/2001 | Freese et al. | |
| 6,270,038 B1 | 8/2001 | Cycon et al. | |
| 6,343,768 B1 | 2/2002 | Muldoon | |
| 6,464,166 B1 | 10/2002 | Yoeli | |
| 6,478,541 B1 | 11/2002 | Charles et al. | |
| 6,513,762 B2 | 2/2003 | Fink et al. | |
| 6,581,537 B2 | 6/2003 | McBride et al. | |
| 6,648,268 B2 | 11/2003 | Dupont | |
| 6,776,580 B2 | 8/2004 | Fink et al. | |
| 6,808,140 B2 | 10/2004 | Moller | |
| 6,857,597 B2 | 2/2005 | Dupont | |
| 6,918,244 B2 | 7/2005 | Dickau | |
| 6,938,408 B2 | 9/2005 | Lair | |
| 7,032,859 B2 | 4/2006 | Mohr | |
| 7,032,861 B2 | 4/2006 | Sanders, Jr. et al. | |
| 7,096,662 B2 | 8/2006 | Wehner | |
| 7,159,817 B2 | 1/2007 | Vandermey et al. | |
| 7,249,732 B2 | 7/2007 | Sanders, Jr. et al. | |
| 7,364,115 B2 | 4/2008 | Parks et al. | |
| 7,475,548 B2 | 1/2009 | Toffan et al. | |
| 7,540,450 B2 | 6/2009 | Brand et al. | |
| 7,581,381 B2 | 9/2009 | Bryant | |
| 7,644,887 B2 | 1/2010 | Johnson et al. | |
| 7,658,346 B2 | 2/2010 | Goossen | |
| 7,665,689 B2 | 2/2010 | McComb | |
| 8,408,488 B2 | 4/2013 | Leaver | |
| 8,622,335 B2 | 1/2014 | Yoeli | |
| 8,672,627 B2 | 3/2014 | Yeh et al. | |
| 8,960,592 B1 | 2/2015 | Windisch | |
| 10,106,253 B2 | 10/2018 | Groninga et al. | |
| 10,788,047 B2 | 9/2020 | Stephens | |
| 2008/0127629 A1 | 6/2008 | Chang | |
| 2009/0121073 A1 | 5/2009 | Doane et al. | |
| 2010/0172761 A1 * | 7/2010 | Le Goff | B23P 15/006 416/198 A |
| 2011/0293427 A1 | 12/2011 | Beachy Head | |

FOREIGN PATENT DOCUMENTS

| | | |
|---|---|---|
| WO | WO2014021798 | 2/2014 |
| WO | WO2014191934 | 12/2014 |
| WO | WO2020038602 | 2/2020 |
| WO | WO2020149495 | 7/2020 |
| WO | WO2020169497 | 8/2020 |

OTHER PUBLICATIONS

Sarpolus, Dick, "Building & Flying Ducted-fan RC Aircraft", 1981, Publisher Kalmbach Publishing.

* cited by examiner 241 242 243 244 245 246 247          248

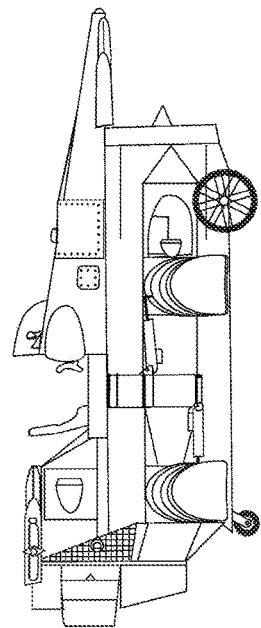
FIG. 59A
Starboard
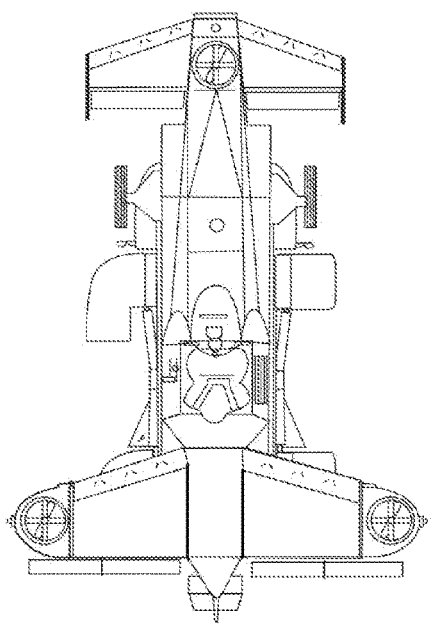
FIG. 59B
Top
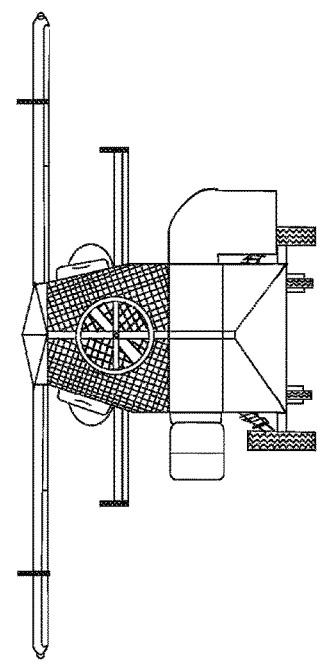
FIG. 59C
Tail
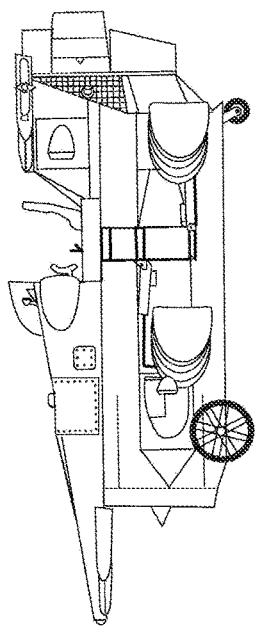
FIG. 59D
Port
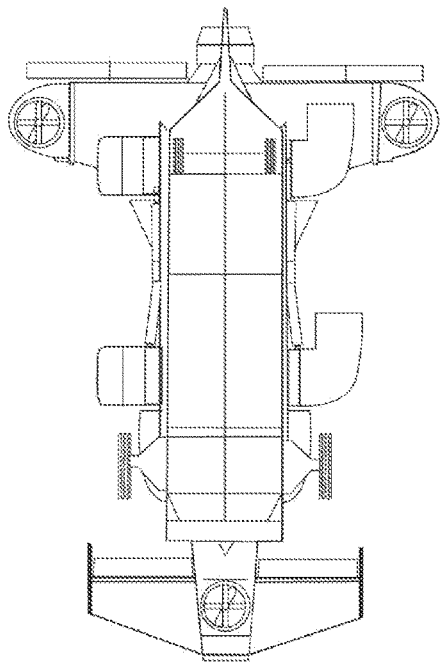
FIG. 59E
Bottom
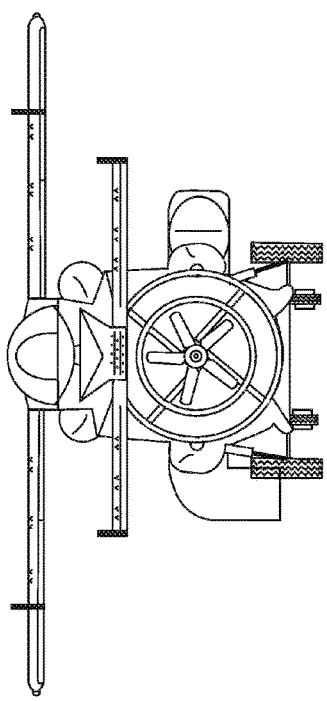
FIG. 59F
Front
Fig. 59

SMALL LIGHT VERTICAL TAKE-OFF AND LANDING CAPABLE DELTA WING AIRCRAFT

CROSS REFERENCE TO RELATED APPLICATIONS

This application claims the priority of U.S. Provisional Patent Application No. 62/990,311 titled "SMALL LIGHT VERTICAL TAKE-OFF AND LANDING CAPABLE DELTA WING AIRCRAFT," filed Mar. 16, 2020, the contents of which are hereby incorporated by reference.

FIELD OF THE INVENTION

The invention relates to vertical take-off and landing aircraft. More particularly, the invention relates to a vertical take-off and landing aircraft having a compressor with nested inner and outer shells wherein a front fan unit is in the inner shell and the rear fan units intakes air from a gap between the inner and outer shells and wherein stators between individual fans adjust to affect airflow within a fan unit.

BACKGROUND OF THE INVENTION

Vertical and/or short take-off and landing (V/STOL) is a term used to describe airplanes that are able to take-off or land vertically or on short runways. Vertical takeoff and landing (VTOL) describes craft that do not require runways at all. Generally, a V/STOL aircraft needs to be able to hover.

The ability for a V/STOL aircraft to hover relies on an ability to manipulate forces for roll, yaw, and pitch. An ability to control roll, yaw and pitch while hovering is necessary for manned aircraft as well as aircraft models.

One type of manned V/STOL aircraft relies upon jet propulsion, e.g., the Harrier "jump jet". One approach is to power an aircraft with a ducted fan driven by a high-speed engine. The engine turns a multi-bladed fan mounted inside a circular housing (the duct), and the fan unit produces thrust which pushes the aircraft through the air.

Difficulties in achieving hover to horizontal flight have, for the most part, stymied the developers of lightweight aircraft.

SUMMARY OF THE INVENTION

In one embodiment, the aircraft of the invention is a small, light vertical takeoff and landing capable delta wing personal aircraft. The aircraft is designed to transport a single pilot beyond 20 miles, operate at unprepared locations and exhibit balanced control in all flight regimes.

The aircraft preferably has a roll cage type body that houses a compressor. The compressor is a dual ducted fan propulsion system powered by a gasoline engine. The compressor has ducting from the fans to directional thrust nozzles at four points about the craft that gives the aircraft an ability to position nozzles down for vertical flight or rearward for forward flight.

In one embodiment, the aircraft measures at 14 to 16 ft. from tip to tail and 9 to 12 ft. from wing tip to wing tip and has a 7 ft. canard. The aircraft stands little over 6 ft. and weighs 253 lbs. dry and 550 lbs with a maximum load. The aircraft is powered by an internal combustion engine that is fed by a 5 gal. fuel tank.

The aircraft is flown by a simple set of controls. The aircraft performs with a standardized mix of traditional flight maneuvers and hovering flight capabilities.

An object of the invention is to provide an aircraft that seasoned pilots will feel comfortable operating and novice pilots will not be overwhelmed by learning. The aircraft should provide the familiarity of traditional operational controls with simple flight commands that promote quick proficiency. An enjoyable safe flying experience is the goal.

In greater detail, the aircraft of the invention includes a frame assembly. A compressor is supported by the frame assembly. The compressor has an outer shell having an intake end and an exhaust end. The outer shell defines a front nozzle port. The outer shell defines a rear nozzle port adjacent the exhaust end. The compressor has an inner shell within the outer shell. The inner shell has an intake end and an exhaust end. The inner shell and the outer shell defining a gap therebetween.

In a preferred embodiment, there is a first front nozzle port and a first rear nozzle port on a first side of the aircraft, and a second front nozzle port and a second rear nozzle port on a second side of the aircraft.

A first fan unit is located within the inner shell. The first fan unit is proximate the intake end of the inner shell. The first fan unit is configured to intake air through the intake end of the inner shell. The first fan unit is configured to exhaust air through the front nozzle port.

A flow divider assembly is located proximate an exhaust end of the first fan unit. The flow divider assembly has a fin at a separation point to split airflow and to guide airflow to the first front nozzle port and the second front nozzle port.

A second fan unit is located within the outer shell. The second fan unit is proximate the exhaust end of the outer shell. The second fan unit is configured to intake air through the gap between the inner shell and the outer shell. In one embodiment, the gap is an annular space that surrounds the inner shell intake end. The second fan unit is configured to exhaust air through the rear nozzle port.

The first fan unit and the second fan unit are preferably connected to one another via a drive shaft. The drive shaft is preferably surrounded by a streamlining tube.

At least one of the first fan unit and the second fan unit includes a plurality of fans including a front fan and a rear fan, a stator between the front fan and the rear fan, the stator having a plurality of stator arms having a leading edge and a trailing edge, and a wing structure pivotally attached to the trailing edge of the stator arms for angling air flow from the front fan to the rear fan.

A front nozzle is rotatably affixed adjacent the front nozzle port for selectively directing the exhaust air for either horizontal or vertical thrust. A rear nozzle is rotatably affixed adjacent the rear nozzle port for selectively directing the exhaust air for either horizontal or vertical thrust.

A linear nozzle actuator is affixed to at least one of the front nozzle and the rear nozzle wherein linear extension and retraction of the linear nozzle actuator rotates the at least one of the front nozzle and the rear nozzle.

The foregoing has outlined in broad terms the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather the invention is capable of other embodiments and of being practiced and carried out in various other ways not specifically enumerated herein. Additionally, the disclosure that follows is intended to apply to all alternatives, modifications and equivalents as may be included within the spirit and the scope of the invention as defined by the appended claims. Further, it should be understood that the phraseology and terminology employed herein are for the purpose of description and should not be regarded as limiting, unless the specification specifically so limits the invention.

BRIEF DESCRIPTION OF THE DRAWINGS

FIG. 59A shows an elevation view of the aircraft of FIG. 1.

FIG. 59B shows a plan view of the aircraft of FIG. 1.
FIG. 59C shows a rear view of the aircraft of FIG. 1.
FIG. 59D shows an elevation view of the aircraft of FIG. 1.
FIG. 59E shows a bottom view of the aircraft of FIG. 1.
FIG. 59F shows a front view of the aircraft of FIG. 1.

DETAILED DESCRIPTION OF THE PREFERRED EMBODIMENTS

Figure 1:
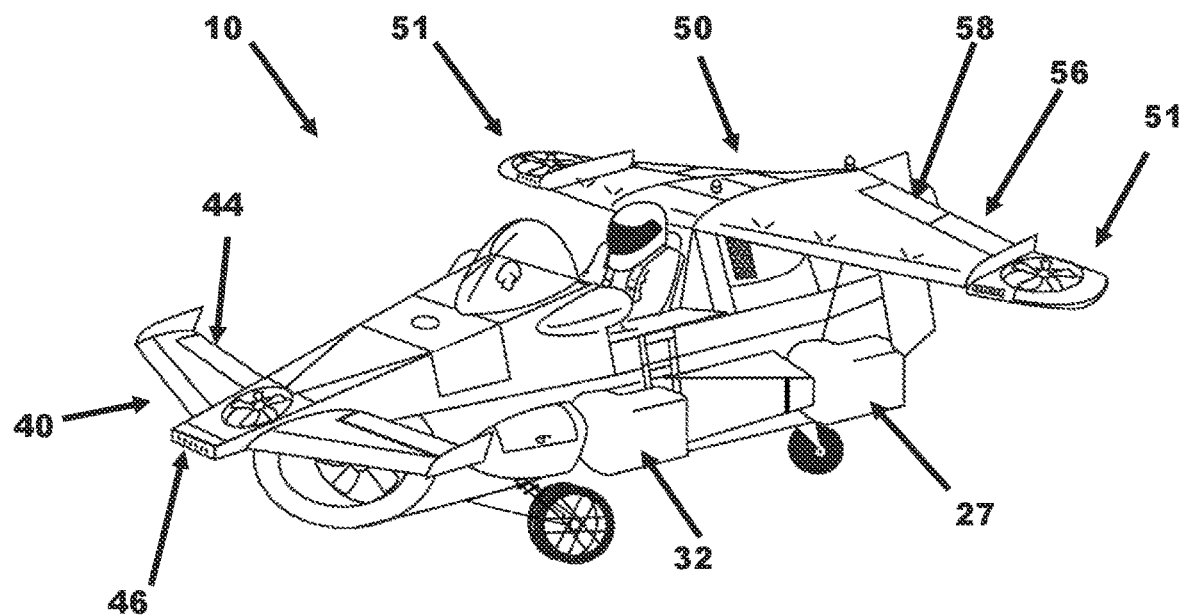
FIG. 1 is a perspective view of a drawing of the aircraft of FIG. 1.

The embodiments herein and the various features and advantageous details thereof are explained more fully with reference to the non-limiting embodiments that are illustrated in the accompanying drawings and detailed in the following description. Descriptions of well-known components and processes and manufacturing techniques are omitted so as to not unnecessarily obscure the embodiments herein. The examples used herein are intended merely to facilitate an understanding of ways in which the invention herein may be practiced and to further enable those of skill in the art to practice the embodiments herein. Accordingly, the examples should not be construed as limiting the scope of the claimed invention.

Fuselage

The fuselage of the aircraft is comprised of an engine bay, control unit, pilot accommodations and mounting for avionics. In one embodiment, the frame is constructed from 1" metal tubing and steel plate welded together. The frame itself is similar to a safety roll cage similar to the type on race cars. Externally, the frame is covered with sheet metal and plastic body panels between the canard and main wing protecting the engine, vital components and pilot. Internally the frame is mounted directly around the compressor and provides a space for the engine and subsystems. Mounts on the side of the frame are the foundations for the nozzle actuator arms. Landing gear is attached to the underside of the frame with mounts for shocks to connect it to the structure.

Wings

The wings are constructed from light metal with three internal support beams providing rigidity to the structure. Conventional rib construction is employed. The wings are skinned with sheet metal and riveted together. The three beams connect wings with a corresponding mount location on the frame. The delta wing has vortices generators on lead edge. The wing has two shrouded propellers nested in the outboard trailing edge section one on each side. These are the hover control units. Between the fans and the aircraft body are the flaps. These flaps on the trailing edge are both elevators and ailerons.

Canard

The canard wing comprises the elevators and forward hover control shrouded propeller. The canard wing is mounted at the extreme front of the aircraft. The canard wings have a 3 degree declination in angle of attack for a nose up lift during forward flight. The leading edge employs vortices generators. The elevators are controlled in flight by cables operated by the flight stick or a fly by wire system using actuators operated by a flight yoke. A front hover fan is mounted between the canard wings and controlled by the pilot through the flight computer digital interface.

Cockpit Cabin Controls

The cockpit is positioned above the engine within the frame at the center of gravity for the aircraft between the four thrust nozzles, the canard and the main wing for locating the pilot at the center of gravity within the aircraft.

A seat with 5 point restraints is on tracks and is adjustable to maintain this center of gravity position for pilots of differing height.

The layout of the cabin dash is to provide the pilot with the necessary information about the aircraft, flight route and about other vehicles or aircraft in the local environment. A Dynon flight instrument system is the primary system. The tablet based system provides a single location for the pilot information to be displayed. The Dynon tablet display bridges the aircraft transponder, flight navigation and the air-traffic control communication link to the flight operations computer.

On the left side of the cabin are the control levers for nozzle rotation and throttle. In the center is the flight control stick yoke with digital interface. To the right low under the pilot is the fire suppression trigger for the engine bay. Analog flight gauges are across the top on the dash to augment the electronic data in the event of flight system failure. The gauges are speed indicator, artificial horizon bubble, fuel gauge, altimeter, flight speed indicator and oil indicator.

Flight Controls

Main Flight Controls:

Main flight controls are operated by a stick type or steering wheel type yoke. The flight stick is attached to the foot plate by an electric joystick. The stick is connected to the avionics by using a cable harness. The harness is routed through the frame assembly. This harness consists of two cable lines for each flight surface connection. The elevators and the rudder are actuated by moving the flight stick. In one embodiment, the flight control yoke is attached to the dash board and supporting structure. The flight control yoke is connected to sensors linked to the flight computer. The flight computer is connected to the avionics by an electric wire harness. The harness is routed through the frame assembly. This harness connects the flight computer to the electric actuators at the flight control surfaces (i.e. flaps, ailerons and elevators).

In one embodiment, the ailerons are operated by foot pedals and they are connected together in the same harness style with dual cables. The pedals pivot on an arm with a digital input device wired to the flight computer. In another embodiment, the elevators and the ailerons are actuated by moving the flight yoke and the rudder is operated by foot pedals. The pedals pivot on an arm with a digital input device wired to the flight computer. All the flight controls are linked through the flight computer and are connected together by a secondary cable harness for backup in case of system failure.

Digital Hover Control System

The digital hover control system is incorporated in to the flight computer to accept input from the flight yoke and foot pedals to provide the pilot the capability to control the aircraft during all flight regimes. The digital hover control system is an electric sub system powered by an alternator. The flight computer has a gyro linked to an accelerometer and can electronically throttle the hover control propellers to maintain a balance for the aircraft. The hover control system does not have to lift the aircraft, but is provided to maintain balance, stability and enhance flight handling. The compressor assembly lifts the aircraft and the hover controls balance the aircraft in hover mode.

The propellers can speed up or slow down to affect the aircraft performance in flight.

As an example, the front propeller may be sped up and the wing tip propellers slowed down to provide nose up pitch in flight during ground effect and/or at slow speed. The system always is working so, during a banking turn, the digital flight control can speed up one wing propeller and slow down the opposite one to enhance the angle of attack into a tight turn.

The hover controls operate similarly to the primary flight controls. However, the inputs made for these controls are digital not mechanical. The flight yoke provides direct input to the flight computer controlling the shrouded propellers at the nose, wing tips and tail rotor to affect pitch and yaw when moved. The rotary pivot sensor for the foot pedals signal the same way to the flight computer to control the rudder shrouded propellers for yaw control.

This performance is on demand to the pilot. When the units are not under active flight control the system returns to maintaining the balance and stability protocol relative to the aircraft configuration. The pitch, roll and yaw axis are accessible to the flight computers command by the pilot Fight Computer In one embodiment, a Navio2 flight computer with Raspberry Pi hat linked to a second Raspberry Pi computer for redundancy. This Navio/Raspberry Pi based system includes standard subsystems as accelerometer, speedometer, gyro orientation and controls for motors, ESC, GPS and heading hold. The flight computer GPS is used to orient the aircraft in space, balanced and pointed in the pilot desired direction. The gyro is used to control and maintain a stable platform automatically without pilot input.

The Hover-Jet Compressor

The Hover-jet Compressor is a thrust vectored ducted fan system is designed to operate in vertical urban airspace. The device uses two ducted fan units nested within a casing which diverts the airflow to the sides. The co-rotating fans are connected together on a drive shaft and are driven by a gasoline engine. The thrust produced by the fans is channeled out to four nozzles.

The fans and ducting are held together by a sub frame assembly or X frame. The X Frame connects and aligns 5 main components and provides structure for mounting external frame and avionics. The driveshaft holds the fan rotors in place within a nacelle frame and u-joint assemblies transfer the rotation from the engine via the torque converter to the individual fan units.

The fan assembly houses three bearing races, one behind each fan in series. The bearings hold the drive shaft and the fan rotors. Protruding from the nacelle are four arms which pass thru the ducting to the sub-frame. This is the frame in the form of an X as a structure.

The nacelle arms connect the fan drive components of both fans units together using full compressor/duct length tubing and reinforcement as the sub frame extends to the engine bay area behind the 2nd thrust nozzle. The nacelle and the arms are sleeved with aluminum forming wing shapes bolted directly to the arms that form a stator assembly. The stators are not directly square. The stators sit at an angle within the duct for lowering the impact of the sound pulse burst as the rotors pass the stators.

The Ducts

The front duct is comprised of 5 features: outer duct, inner duct, nacelle, stators and bearing races. From the center within the nacelle the bearings hold the fan drive shaft inside the duct. The nacelle is held in place by the stators. The stators arms pass thru the inner duct wall and thru the outer duct area and wall mounting to the sub frame. The arms are covered by aluminum sheeting forming four internal wings within the outer duct.

The rear duct has the same X frame design as the front fan assembly. However, it is not nested in a larger duct and the stator is not as long. Both ducts have the ends of the nacelle arms sticking out to connect with X frame runners. The runners span the compressor and connect both fan units together and add reinforcement where needed to prevent twisting and bending of the structure.

The Fans

The fans are 26" diameter with multi-pitched 5 bladed rotors. The hub is 8" and blades are 8" long. The fans are mounted on the driveshaft by the hub. The drive shaft has a corresponding mount for each hub. The fan component is bolted into place at the proper point on the shaft. The drive shaft for the rear fan assembly extends thru the fan section and extends forward to a u-joint that attaches to the two fan units together. This connects the fan drive shafts to each other and to the engine. Using a torque converter as a transmission device enables the use of small general purpose gasoline engines.

The X frame holds all the drive train moving parts in line to each other and bears the force load under operation at a low weight. The modularity of this configuration accommodates use gas engines or electric motors to supply rotation for the fans.

Chain Drive

The chain drive system uses a torque converter as a transmission assembly. The chain drive system is mounted directly to the engine within engine bay. The chain drive system connects the engine to the fan driver shaft by a chain and sprocket arrangement. The drive sprocket on the torque converter is a 6.75" 40 tooth and the socket on the fan drive shaft 3.25" 20 tooth. This configuration provides for a one to two (2:1) rotation in the system, thus gearing up the output from the engine. In this case, for ease of access and proper rotation, the output shaft the engine is pointed rearward. This makes it easier to install the torque converter, to calibrate the chain drive components and maintenance.

The Engine

The engine is a Predator670 cc general purpose engine. The selection is because it is widely available, has small footprint, light weight and up-gradable. The 22 hp conventional automotive fuel power plant generates 45 NM@2500 rpm, weighs 110 lbs and has a 1" output shaft with a ¼" keyway. This is compatible with TAV 780 torque converter drive upgrade. Modifications include removal of governor from the engine, an electric fuel pump to assist the pulse pump fuel system, high performance carburetor, air filter and alternator rounds out the engine upgrades.

The Casing

The casing divides the airflow from the fans and directs it to the nozzles. The casing is manufactured from 3/16" PETG and ABS plastic. It is vacuum form molded to shape using wood and fiberglass molds. These molds are used to cast the casing parts. Each mold can be cast twice to produce one casing sub component. The casing is comprised by four types of segments. The first is the duct fan nozzle diverter. And the second is the front outer duct around the 1st fan unit. The third is the outer casing connection section which supplies air for the 2nd fan. The fourth is the fan duct units. The nozzle diverter sections mount behind the fan duct within the sub frame to deflect or divert the airflow to the thrust nozzles on the sides. The front diverter section is nested in the outer duct. The rear diverter section is mounted to the 2nd fan assembly.

The casing has influence on the air mass by means of shape. Within these ducts, vortices generators are mounted in a similar position as to on the wings-right where the duct arms bend the airflow outward towards the nozzles. This creates a tornado type of vacuum to occur within the duct arms. Thus preventing back flow pressure in the duct and pushing the air mass out the nozzles. The effect is an attempt to lower the "wetting" of boundary layer air stagnation against the duct wall.

The outer duct nests the 1st fan assembly inside of it. The outer duct is to provide air for the 2nd fan assembly. Fairings within the duct bridge over the 1st fan nozzle arm sections in the front section. A wedge shaped fairing trails off the back side of the 1st fan nozzle diverter down to a central point middle of the duct area and has an opening for the fan drive shaft to pass thru. This wedge shape extends from the top and bottom of the 1st fan diverter to a central point just before the 2nd fan.

The Thrust Nozzles

The thrust nozzles are cast in ABS plastic using the vacuum form technique. They adhere to a form and shape consistent to position the thrust at a desired angle, position or defection. The nozzles have a vane in the exit area to straighten the airflow before the mass exits. On the outer edge of the nozzle is a control arm which is connected to the nozzle rotation actuator and is aligned to the bearing orientation.

The nozzles are mounted to the bearings. The bearings provide the ability to rotate the nozzles around the nozzle arm repositioning the nozzle outlet to the desired angle Nozzle Mounting Ring The fan diverter casing arms extend out perpendicular from the casing and drive train. On the end of the arm is a nozzle mounting ring. The mount is manufactured with a flat plate ring on the inner diameter to install the assembly to the frame and stabilize the nozzle arm. A hub like wall around the inner diameter offset to one side of the ring with supports on the on the other side to hold the nozzle bearings. The bearings mount directly to the extended ring section. The extended section couples around the nozzle arm end and secures a frame mount for the nozzle unit.

The ring is drilled with a pattern that matches 14" inner diameter of the bearings. The bearing bolts to the mounting ring. Two bearings are connected to ring with spacers separating them by 2". The ring mount is bolted to the nozzle arm with brackets. The nozzles bolt directly to the outer portion of the bearings with brackets. Lips in the nozzle collar are seats for both the bearings.

Nozzle Rotation

The aircraft uses four electric actuators to rotate the thrust direction nozzles. The actuators are located two on each side of the craft. The two actuators that are facing forward and the two actuators facing aft are connected to a pivot point on the side of the frame. At the base end (against the frame) the actuator arms are mounted directly to the frame. The other end of the actuator is connected to the nozzle control horn on the coupler end of the nozzle. As the arm extends the nozzle rotates on two sets ball bearings. The bearings hold the nozzle in place and allow for it to rotate perpendicular to aircraft body.

Riding on bearings, the nozzles can direct the thrust down for vertical take-off and landing or to the aft for forward flight. The nozzles actuators are controlled electronically by an input lever in the cockpit. Moving the lever forward extends the actuator arms rotating the nozzles to point to the rear pushing the craft forward. Moving the lever backwards retracts the actuator arms to point the nozzles trust down for vertical lift.

Hover Control System

The hover control system includes four electric shrouded propellers working as a tri-copter drone would. The flight yoke and foot pedals are the input devices for the flight computers to manage the electric speed controllers for the motors driving the hover control props. The control system is a digital system. The system is not required to lift the aircraft, only to balance the aircraft. The Hover-Jet VTC compressor lifts the aircraft and the flight computer uses a gyro to vary the speed of these propellers and the angle of nozzle deflection to control balance of the aircraft.

Conclusion

The aircraft of the invention is of a modular configuration to enable the use of various parts, subcomponents and up-grades. The fan drive shaft design allows for retrofitting different rotor types to the system for testing and evaluation. The ABS plastic casing and X frame have space for refinement and alternations as unit specific modifications without the need to dismantle the entire aircraft for installation of upgrades. The system by design is compartmentalized for cost effective mass production, simple manufacturing and reliable performance. All with the goal in mind for advancement of the technology and enhanced performance in all flight regimes.

Controls Summary

Main flight controls are operated by a stick type yoke. The flight stick is attached to the foot plate and the flight computer by an electric joystick. The stick is connected to the avionics by using a double cable harness. The elevators and the rudder are actuated by moving the flight stick. The ailerons are operated by foot pedals and they connected together with dual cables for reliability. The pedals pivot on an arm with digital input device wired to the flight computer.

Trade Off Summary

Airframe: The overall design is to place the pilot at the center of gravity on the aircraft in two distinct flight modes. The cockpit is positioned over the Hover-Jet engine within the frame at the center of gravity for the Aircycle between the four thrust nozzles, the canard and the main wing. The center of gravity for forward flight and the center of gravity for hover flight are aligned to the same point when the pilot is seated. A benefit is that there is no need to shift loads when transitioning from one flight mode to another.

X-frame sub structure: The use minimalist frame design is to provide strength and rigidity for less weight. The risk is performance under a load. The X frame may twist and require reinforcement. A benefit is a light weight sub frame.

Use of thermoplastics in construction: ABS plastic thermo vacuum form molded to manufacture the duct casing may provide easy construction but may not have the durability desired. Alternative materials are considered in development mix. A benefit is ease of manufacturing.

Torque converter: The use of torque converter is to permit engine operation without engaging the fan drive train for maintenance. Tuning the system is similar to a car transmission allowing operation of the engine and not engaging the wheels. A benefit is ease of maintenance.

Commercial Considerations

Innovations and Technological Enablers

Innovations:

Vortices Generators:

The use of Vortices generators on the wing leading edge to reduce the stall speed of the wings to give wing borne lift faster during transition between hover and flight.

The use of the same type vortices generators inside a thrust vectoring casing to induce a vacuum within the duct to lower the "wetting" drag losses, prevent back flow or pressure loss to the air mass.

R/C Flight Computers:

The use of hobby type fight computers as control systems of aircraft represents the next evolution automated flight systems for general aviation. Having a user friendly input interface with simple controls allows for the aircraft to be programmed with a variety of characteristics.

Hover Control System:

Electric shrouded propellers may be used to control the aircraft during hover, slow speed forward and transitional flight regimes but not necessarily to lift the craft. The integration of tri-copter type shrouded propellers into an aircraft to affect performance in hover or flight as a means to position or maneuver as a secondary control system. The primary lift is derived from another source. The hover controls orient and balance the aircraft to stabilize it on top of a thrust column.

Employed Technology:

Dual inline ducted fans connected by driveshaft within a sub-frame.

Thermoplastic molded thrust vectoring casing.

Flight control computer x3 for redundancy and safety.

Electric hover control system

Alternator for electric power generation.

Market Driven Design:

The aircraft outlined in this submission is based on research and development originally to examine the adaptations of turbine by-pass fans and automotive engines to create thrust for non-conventional ducted fans employing thrust vectoring capabilities for vertical flight. The Hover-Jet Compressor design can be adapted to incorporate the use of two Pratt and Whitney Jt-6.5 turbine intake/bypass fan assemblies within the casing as the ducted fans. Additionally, A Viking Engines engine with the automatic transmission would be employed. The frame structure and wings are up graded to support the weight creating a moderate sized vehicle with power and endurance.

The aircraft of the invention is intended to perform as a frontline combat platform. Armored and armed, the aircraft fills the role of a short and very close air support aircraft. Using vertical flight and controlled hover the aircraft of the invention can support or defend ground troops, participate in proximity engagements or provide security escort for convoys. The aircraft of the invention is capable of operations within existing troop structure and air traffic management systems. Operation of the aircraft is simple to learn, easy to use and easy to repair in the field. The aircraft of the invention provides 6 hard points to mount a variety of weapon subsystems including medium machine guns, rocket propelled grenades. The aircraft brings a unique level of protection from other aircraft and vehicles. The aircraft a light weight and can provide a heavy weight punch. The self-contained and compact aircraft is a soldier's ultimate off road vehicle.

Safety Driven Design:

Reinforced Frame

The most important safety consideration is for the pilot. The aircraft has a roll cage frame style body that surrounds the operator. The aircraft has shock absorbing landing gear. Additionally, the pilot seat is mounted to aluminum honeycomb crumple zone components and above the pilot is a roll bar built into the frame. A windscreen deflects the oncoming air and the aircraft body protects the pilot.

Low Stall Wing

The aircraft preferably has a very low stall speed. Vortices generators (VGs) are installed along the lead edge of the canard and main wing.

VGs are provided to generate lift on the wing at very low speeds to enable wing borne lift earlier in the transition to and from hover mode to flight mode. High wing loading is the objective. The aircraft uses this extra capacity to increase the glide capabilities resulting in lower fuel use, better flight performance and the ability to shut off the engine and glide to a landing.

Seat Belts

A 5 point restraint seat belt will be employed on the aircraft.

Draft safety report

Single point failure

Hazards: Avionic flight control loss

Conventional: a double cable system is provided to activate avionics. Therefore, if one cable fails the second system still remains connected resulting in no loss of avionics control.

Digital: Tri/quad copter type flight computer for hover control using ducted props powered by electricity generated from alternator on slave engine.

Engine torque converter malfunction engine loss in flight: Uses other subsystems to initiate safe landing. Glide to "dead Stick" landing. Very low stall speed on the wings and canard for assisting in transitional flight, hover and glide Engine torque converter malfunction in hover: Robust fuselage, sub frame and shock absorbing landing gear. To absorb ground impact during low hover.

Power loss to computer systems: Dual flight computer system to manage flight parameters with battery back-up.

Mechanical failure with drive assembly: Metal safety plate between the hover-Jet compressor, engine and pilot.

Fire in engine compartment: Fire suppression equipment in engine compartment.

Risk of pilot falling out: Seat belts.

Safety Report

Pilot: Training, experience, exposure.

Airframe: Landing gear, shock absorbing frame, Delta wing, lower stall speed and seatbelts.

Controls: Single stick flight controls, double cable avionics controls, separate hover controls input, fire suppression system, flight transponder, lights of visibility, radio and heads up display.

Safety is of primary concern for both the pilot and persons around the craft either in the air or on the ground. Safety considerations are divided into three distinct categories: 1. Pilot, 2. Airframe and 3rd control systems. The goal is to establish baseline techniques of safe aircraft operation and predictable performance regardless of environmental factors.

Pilot

All safety starts with the pilot. Through training and exposure to the aircraft, the pilot will gain experience and familiarity with how the craft handles in different flight regimes. Subsystems of the aircraft provide the pilot with information about the condition of the aircraft and surrounding environment. This allows the operator to maneuver safely thru transitional urban airspace.

Airframe

The aircraft is designed to be safe. Throughout the aircraft redundancy and duplication provide risk prevention and mitigation. The fuselage frame is designed with shock absorbing landing gear. Around the cockpit and electronic bay the frame is insulated against lighting strike. The pilot seat equipped with seatbelts is mounted on aluminum honeycomb to crumple on ground impact The aircraft has a delta wing configuration with canard to enhance transitional flight and to provide a broad glide ratio. The wings have vortices generators on the lead edge to lower wing stall speeds and to get the slow speed stall moment down to provide wing bore lift earlier in the transition from hover and to extend the moment of available lift entering hover. By increasing the wings lift profile gains in performance are achieved by making an overall better glide capacity for the aircraft.

Control Systems

The aircraft uses two types of control systems that augment safety. Cockpit flight controls are interactive elements with which pilot can affect the operation or orientation of the aircraft with four input devices. A flight control stick actuates the elevator and rudder as well as the hover control for pitch and yaw. Foot pedals operate the ailerons for roll in forward flight. The thrust nozzle control lever positions the nozzles in the desired direction. And the throttle controls the engine speed and power output.

Project execution: Risk management

Top three risks:

1. Engine failure:

Forward flight: In the event of engine failure the aircraft is designed to glide to a safe landing.

Hover flight: In the event of engine failure the aircraft is designed to glide at slow speed and the landing gear to absorb the ground shock.

2. Avionics failure:

In the event that an avionic surface loses connection cable tension the second cable will provide operational usage. Dual cable harnesses lead from the flight stick to each avionic.

3. Nozzle position actuator failure:

In the event that the nozzles actuator arms fail to rotate the nozzles during flight. The nozzles can be moved by a manual lever. The rotation is only into forward flight position and will not allow for hover landing. Conventional landing can still be accomplished.

Below is a detailed description referencing the figures with numerically labeled components. The same components may be labeled with the same number throughout the figures or may be labeled with different numbers depending on the particular figure in which the component is shown.

FIG. 1 is a perspective view of one embodiment of aircraft 10 of the invention.

Figure 2:
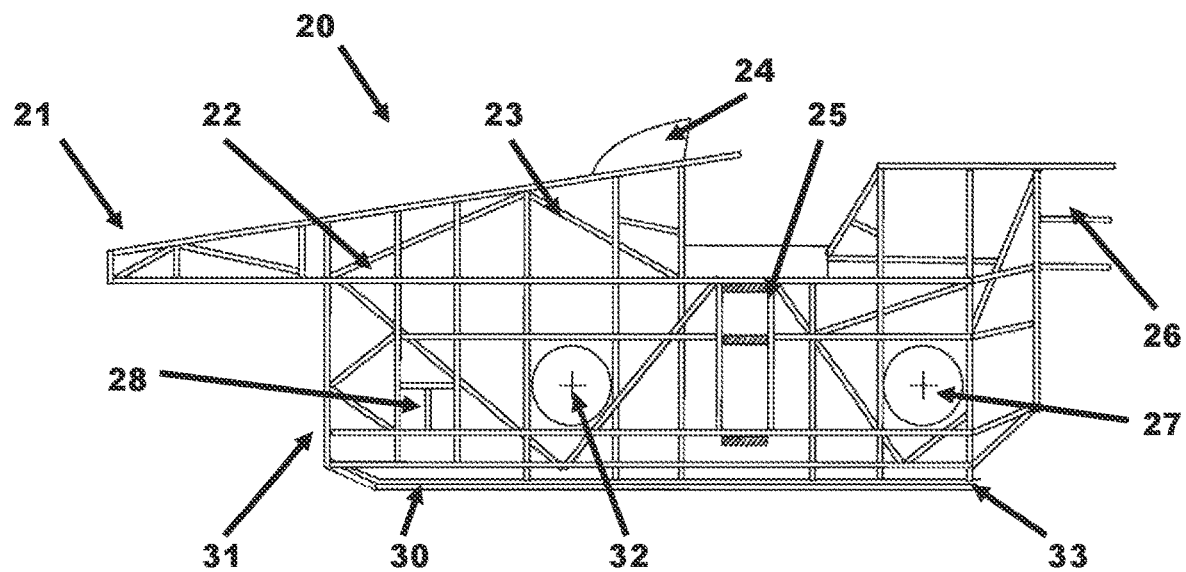
FIG. 2 is an elevation view of the fuselage and frame of the aircraft of FIG. 1.

FIG. 2 is an elevation view of a frame assembly 20 of aircraft 10 of FIG. 1. In one embodiment, frame assembly 20 is constructed of metal tubing. Starting at nose 21 of aircraft 10, frame assembly 20 forms the canard mount and houses space for the front hover control shrouded propeller assembly. Frame assembly 20 is integrated to house the Hover-Jet compressor and provide mounting areas for avionics sub systems 22. Frame assembly 20 is reinforced both within the individual sides and across to join a 2nd frame to create a stable structure 23. Windshield 24 is mounted to the frame assembly 20. On both sides of frame assembly 20 is installed ladder 25 for access to the aircraft cockpit. At the tail end two mounts are in place to hold rudder control shrouded propeller 26. Within frame assembly 20, on both sides, space is allocated to receive and hold the compressor arms and rear nozzle assembly 27 having a first rear nozzle and a second rear nozzle. At the front, under nose 21, frame assembly 20 has mounting area 28 for a shock absorber to attach. This segment works in conjunction with the front landing gear A-frame arms, which hold the front wheels and attaches to frame assembly 20 at hinge point 30. Section 31 is reinforcement for an intake lip. The frame assembly 20 also includes a mount for the front thrust nozzles 32, i.e., a first front nozzle and a second front nozzle. At the tail end on the bottom of both sides of frame assembly 20 are mounts 33 for the rear landing gear.

Figure 3:
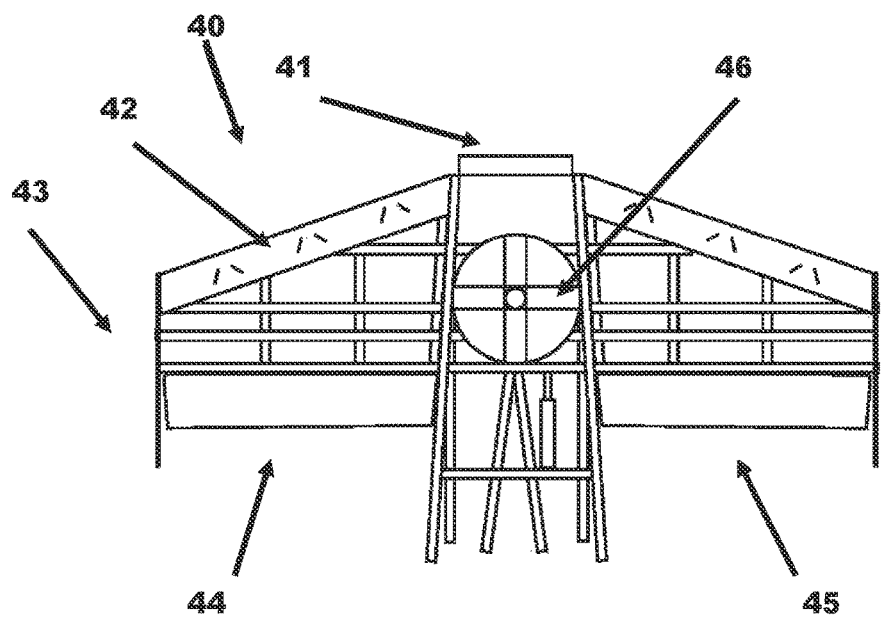
FIG. 3 is a plan view of the canard frame of the aircraft of FIG. 1.

FIG. 3 shows a plan view of canard assembly 40 includes a light at front 41. Vortices generators run across the top of wings 42. The canard wing tips employ fences 43 to funnel air over the canards in flight. The canards have flaps 44 on the trailing edge that act as elevators in forward flight. Flaps 44 are operated by electric actuator 45 mounted in the nose section and coupled to the elevators. In the center of the nose canard assembly is the front hover control shrouded propeller 46.

Figure 4:
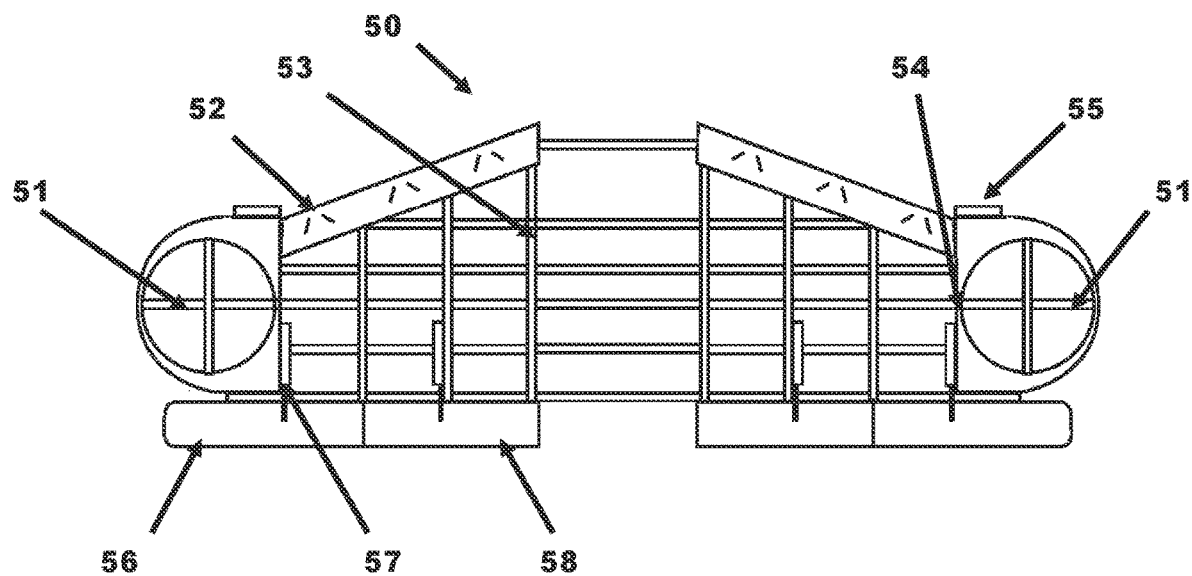
FIG. 4 is a plan view of the wing frame of the aircraft of FIG. 1.

FIG. 4 shows a plan view of main wing 50. Main wing 50 is mounted to frame assembly 20 aft of aircraft 10. Main wing 50 includes two shrouded propeller hover control units each having one hover control shrouded propeller 51 is mounted on each side of main wing 50. The top of main wing 50 on the lead edge also employs vortices generators 52. Main wing 50 has connection space 53 and mounts to accommodate frame assembly 10. At each wing tip before hover control shrouded propellers 51 are wing fences 54 to funnel air across the wing aerodynamic surfaces. On the lead edge of the hover control units are lights 55. The main wings have two distinct types of flaps on the trailing edge. On the outboard end are ailerons 56 to provide banking turns and roll capacity. All the flaps are attached to electric actuator 57 providing movement. Next to ailerons 56 on the trailing edge are elevators 58. Electric actuator 57 are controlled and connected to elevators 58 on the canard and respond with the same input command.

Figure 5:
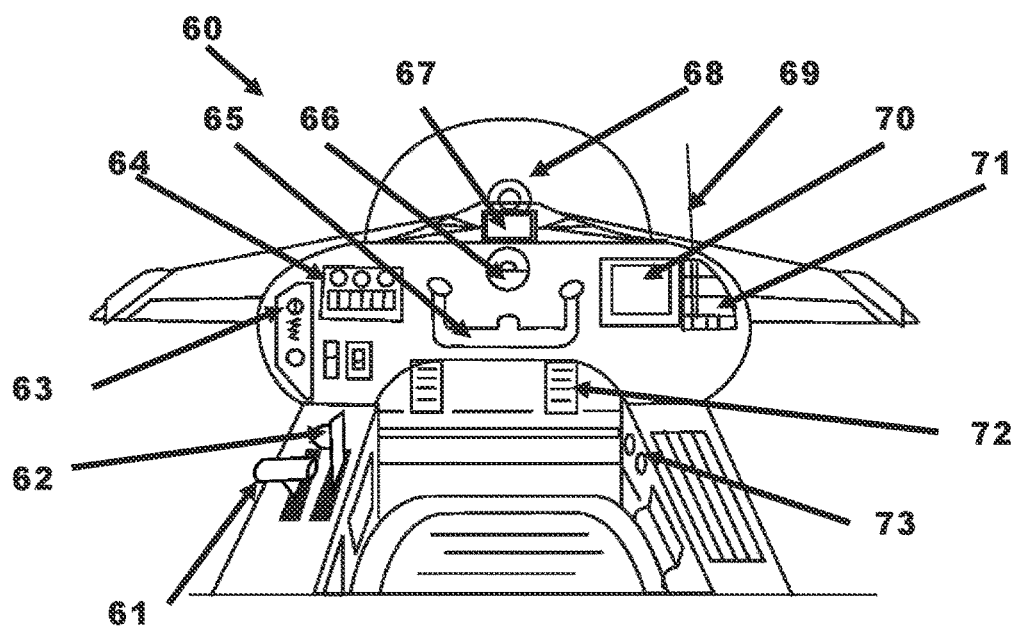
FIG. 5 is an elevation view of cockpit controls of the aircraft of FIG. 1.

FIG. 5 is a perspective view of cockpit controls 60. Cockpit controls 60 are simple and conservative. A mixture of digital and analog systems are used to give the pilot as much capability as possible. Throttle 61 is the main control to regulate engine speed of aircraft 10. Next to throttle 61 is the single lever hover control 62. Ignition key switch 63 is provided to start the engine of aircraft 10. On the side of the dash is light switch module 64 for controlling navigational and observational lights. Steering yoke 65 is in the center of the dash and controls pitch and roll of aircraft 10. Above steering yoke 65 is analog compass 66. Above compass 66 is digital head up display 67. Heads up display 67 is preferably GPS connected and shows the pilot a digital compass, directional heading, speed, altitude and orientation. Above heads up display 67 is analog artificial horizon indicator 68. On the right side of the dash at the top is radio antenna 69. This is coupled with the dashboard display unit 70, which provides navigational data and aircraft interlink with air traffic control. Additionally, secondary flight radio 71 is located further to the right. Foot pedals 72 operate the rudder assembly for yaw in both flight and hover. Auxiliary power outlet 73 is installed low on the foot plate.

Figure 6:
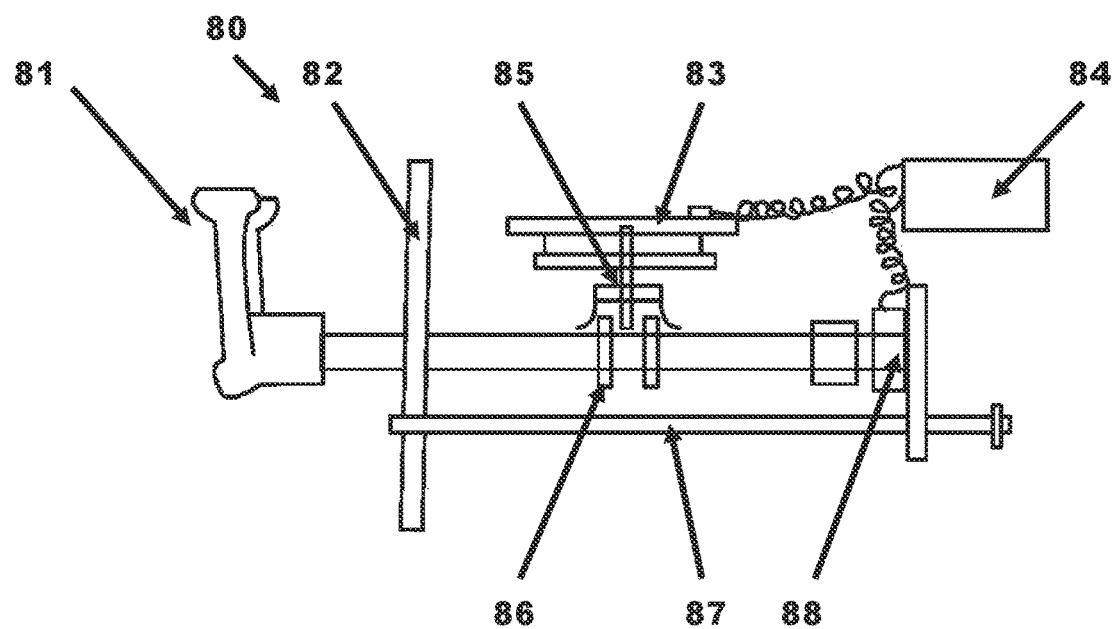
FIG. 6 is an elevation view of the main flight control of the aircraft of FIG. 1.

FIG. 6 is a schematic diagram of yoke controls 80. Yoke controls 80 are preferably electric and input commands to the flight computer. Yoke 81 is the pilot interaction device. Yoke 81 is internally mounted through dash 82. Yoke 81 provides the pilot the ability to maneuver aircraft 10. This is accomplished using to electric sensor devices. The first electric sensor device is slide sensor 83. Slide sensor 83 controls the pitch of aircraft 10 in relative orientation to the position of aircraft 10. Slide sensor 83 is connected to flight computer 84. Slide sensor 83 is mounted to a compartment under dash 82 and connects to yoke 81 by extended pin 85. Extended pin 85 fits into ring 86 on the yoke shaft, which facilitates movement of yoke 81 to move back and forth to input commands to the flight computer. Under the yoke shaft are two set rails 87. Rails 87 secure rotary sensor 88 and allow for back and forth movement of yoke 81. Rotary sensor 88 provides input commands to the flight computer for roll. Rotary sensor 88 is also linked to the flight computer electronically.

Figure 7:
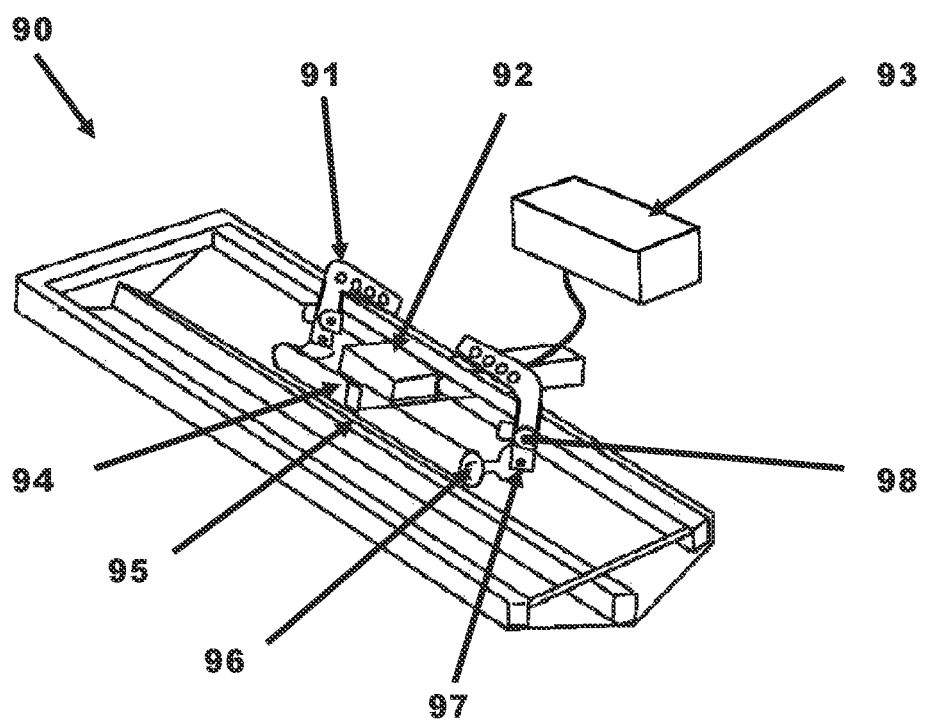
FIG. 7 is a plan view of the mechanical foot pedals of the aircraft of FIG. 1.

FIG. 7 is a perspective view of foot pedal aircraft controller 90. Foot pedal aircraft controller utilizes foot pedals 91 for controlling the aircraft rudder. Pedals 91 are mounted internally to the cockpit compartment. Pedals 91 operate rotary sensor 92 mounted to frame assembly 20. A sensor is electrically linked to flight computer 93. Rotary sensor 92 is connected to foot pedals 91 by swing arm 94. Swing arm 94 is attached to frame assembly 20 on the bottom by pivot 95 and to the top by the sensor input coupling. Ball eyelet links connect foot pedals 91 to swing arm 96. Another set of eyelet links connect swing arm 94 to the foot pedal link 97. Pedals 91 are affixed to frame assembly 20 with hinge 98.

Figure 8:
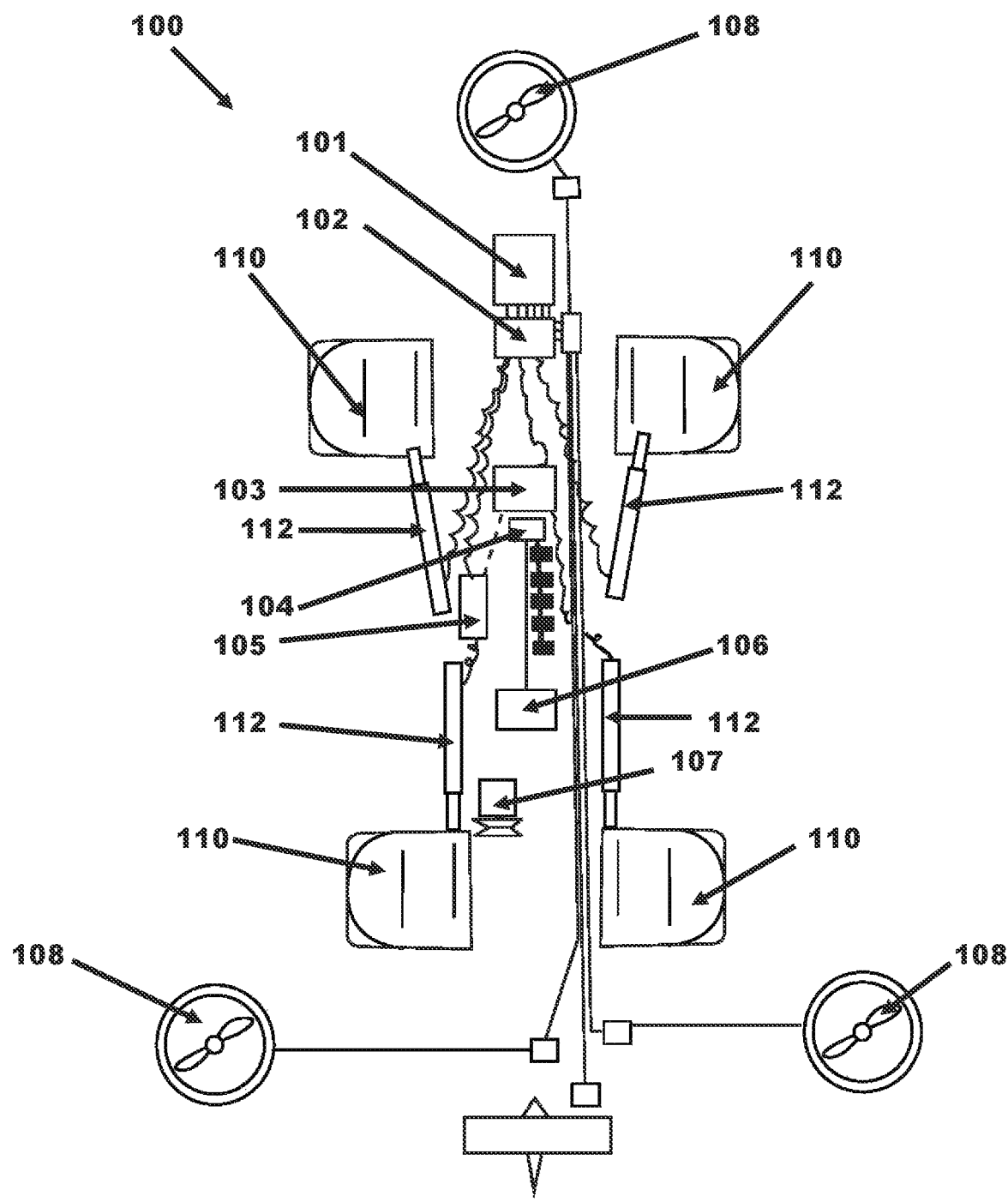
FIG. 8 is a schematic of the distal hover control system of the aircraft of FIG. 1.

FIG. 8 is a schematic of control system 100. System 100 has an integrated digital interface for auto stabilization for nozzle and shrouded propeller control in hover mode. System 100 uses a flight computer to control aircraft 10 and execute pilot commands for hover, transition and forward flight regimes. System 100 incorporates three distinct actions to achieve, maintain and control aircraft 10 using flight computer 101. System 100 uses Raspberry Pi computer 102 to link secondary gyro 103 to flight computer 101. Third computer 104 is used to interface the command control sensors to the performance units. Single lever input 105 is used to direct between operation modes. System 100 is an electric system and requires battery 106 and alternator 107. The performance units are shrouded propellers 108. Directional nozzles 110 lift aircraft 10 and nozzle actuators 112 to direct the thrust from nozzles 110. Electronic Speed Controllers (ESC) adjust the speed of shrouded propellers 108 to balance aircraft 10 on top of a plume of air generated by the compressor. Nozzles 110 are orientated to direct the thrust down and can adjust to balance aircraft 10 using the gyro.

Figure 9:
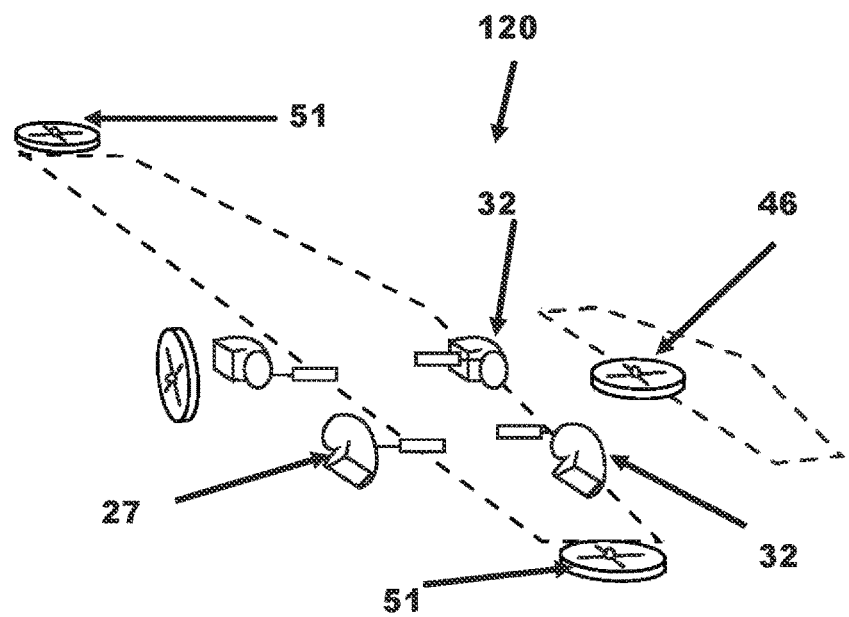
FIG. 9 is a plan view of the hover control system of the aircraft of FIG. 1.

FIG. 9 is a schematic showing how control system 120 works within the confines of the structure of aircraft 10.

Figure 10:
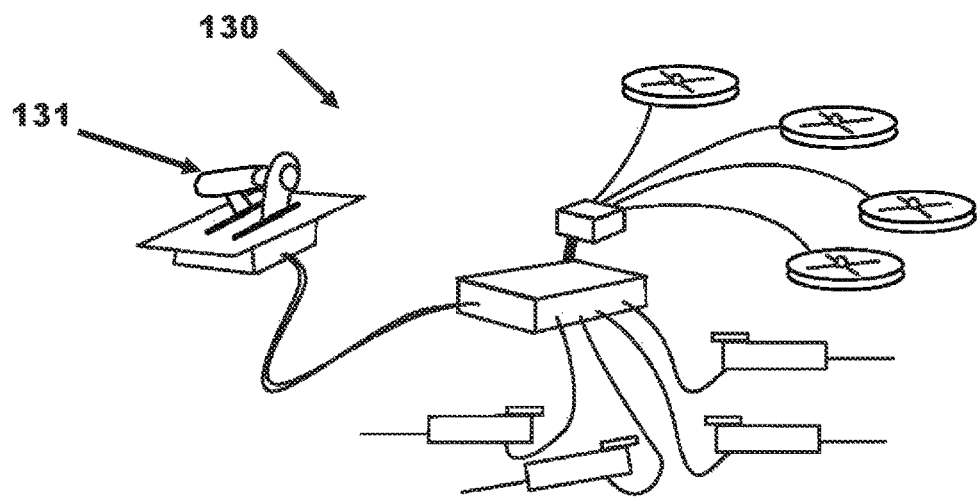
FIG. 10 is a plan view of a single lever hover control of the aircraft of FIG. 1.

FIG. 10 is a schematic of single lever hover control system 130. In one embodiment, single lever hover control system 130 is comprised of 6 components. Throttle 131 adjusts the engine RPM to generate enough thrust to raise aircraft 10 off the ground. The single lever input activates the nozzle actuators to position the nozzles down for hover. The flight computer maintains the pilot input signals and corresponding mechanical actions to effect vertical flight. The gyro holds balance as aircraft 10 lifts off the ground. Once airborne, the shrouded propeller hover controls use the gyro to maintain balance and stability of the aircraft.

Figure 11:
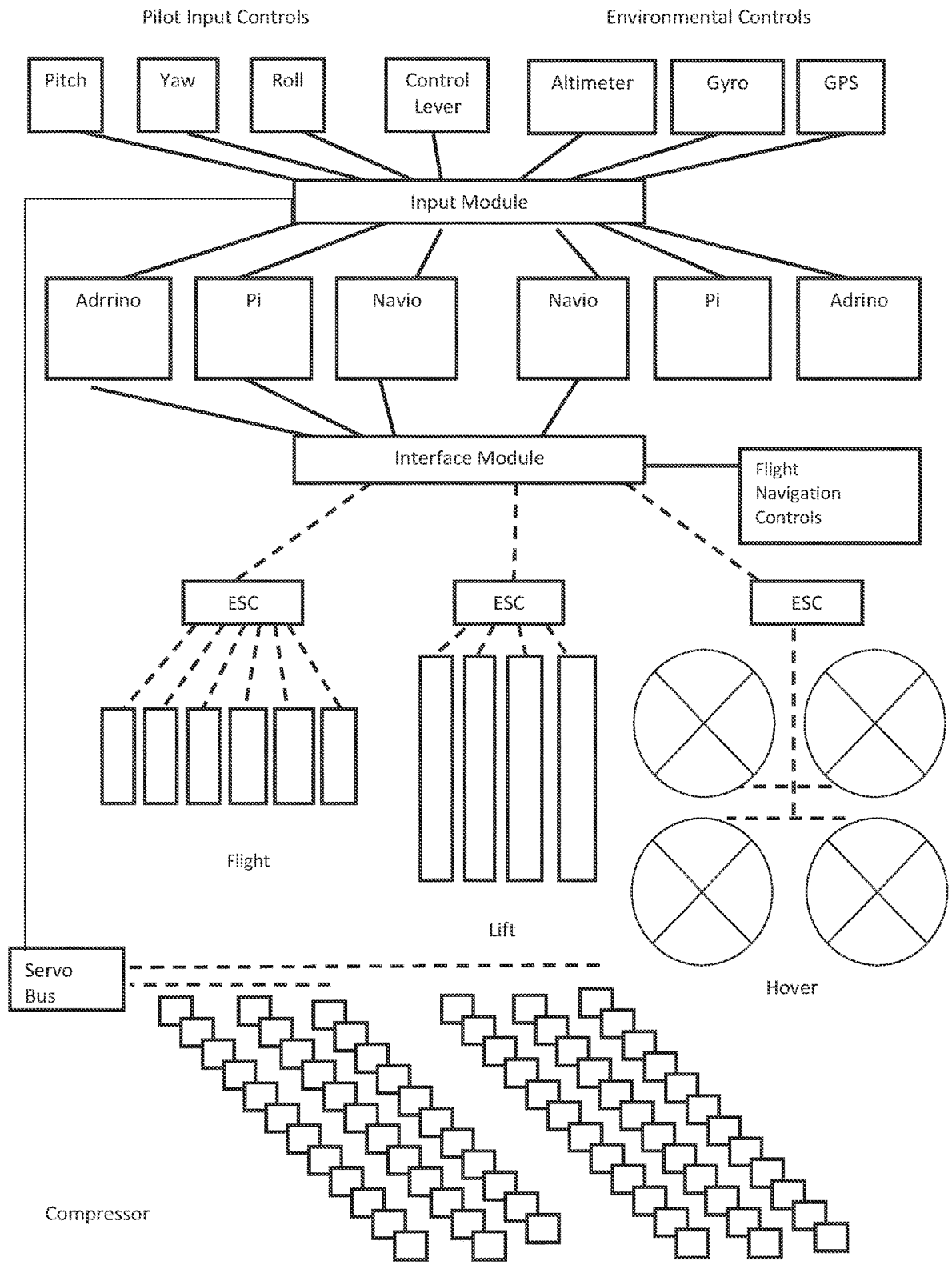
FIG. 11 is a schematic of the flight computer and system interface of the aircraft of FIG. 1.

FIG. 11 is a schematic of computerized flight controls. Computerized flight controls are used during all flight activities. To accomplish this there are three distinct modes: Flight, Lift and Hover. The hover control shrouded propellers are active through all flight regimes. The single lever controls the nozzle position and orientates the thrust direction.

Pitch and Roll are controlled by the Steering Yoke (P and R). Yaw is controlled by the foot pedals (Y). The transition between hover flight and forward flight is controlled by the single lever (L). An Input Module ties the sensors together. The Input Module (INM) also connects the Altimeter, GPS and the Flight Navigation Interface (FNI) system into the flight computer. The flight computer is preferably two sets of three computers. Each set consists of an Adriano, Raspberry Pi and a Navio computers. Both unit sets are linked together give the total system redundancy. The flight computers are connected to Interface Module (IFM) to link them to each other and to the subsystems they operate. The Interface Module divides the input commands to the appropriate subsystem. Subsystem 1 controls the actuators responsible for control in forward Flight. Subsystem 2 controls the actuators responsible for Lift. Subsystem 3 controls the shrouded propellers for hover orientation. The subsystems performance can be modified by using the ESC in each the systems. Within the architecture there is consideration for adjustment to the stator pitch in the compressor. The (CS) unit can adjust the stator blade pitch to balance environmental considerations such as altitude, humidity and barometric pressure. This system can be set to be automatic based on altimeters settings or adjusted as necessary. There are 24 servos in the accompaniment one for each of the stators.

Figure 12:
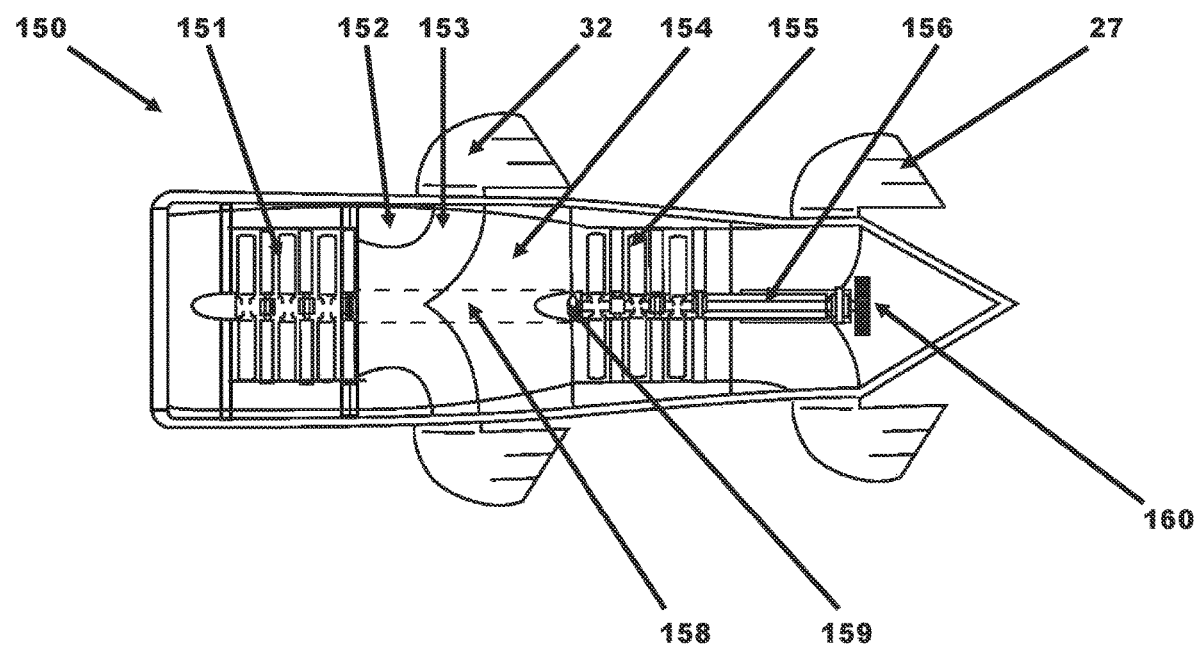
FIG. 12 is a plan view of the compressor of the aircraft of FIG. 1.

FIG. 12 is a plan view of one embodiment of compressor 150. Compressor 150 incorporates novel adaptations to generate thrust and to direct it to derive a given performance. The configuration includes a nested 1st duct fan unit 151 within the casing of compressor 150. This allows for more air to be funneled to the 2nd ducted fan unit 155. In the casing, allocations are made to streamline air flow to 2nd fan unit 155 by using ramps 152 over the protruding nozzle arms 153 of 1st fan unit 151. Once over the nozzle arm restriction, a wedge shaped platform 154 directs air into 2nd ducted fan unit 155. Through the center of the casing behind 1st fan unit 151 spanning the gap between the fan and the thrust vectoring casing is tube 158 covering the driveshaft. Tube 158 extends through wedge 154 to the front of 2nd fan unit 155. 2nd fan unit 155 has a similar tube 156. Both of these drive shaft cover tubes 156, 158 streamline the internal sections. The fans are driven by an external internal combustion engine. Both the fan units are connected to the engine by a drive shaft. The drive shaft is rotated by sprocket 160 connecting the engine to the fan drive shaft by a chain. Between the ducted fan units is a u-joint coupler 159 forming the two individual fan drive shafts into a singular drive train component.

Figure 13:
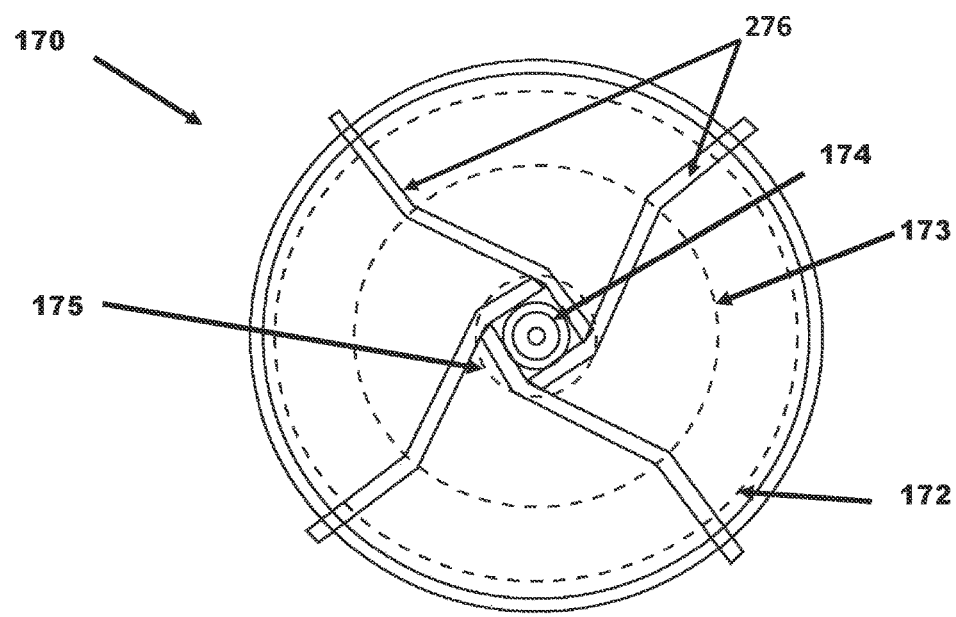
FIG. 13 is an elevation view of first ducted fan assembly of the aircraft FIG. 1.

FIG. 13 is an elevation view of 1st ducted fan unit 170. In each fan unit the fans are secured within by a stator. The stators are uniform and consistent. Each stator core comprises a bearing mount 174 held in place by arms. In the case of the 1st unit 170 the arms extend out through the duct 173 and outer casing duct 172. In the center, a housing 175 covers the space between each bearing race but does not impede rotation of the fans. Externally of the casing (outer duct 172) the stator arms are connected to a sub frame assembly.

Figure 14:
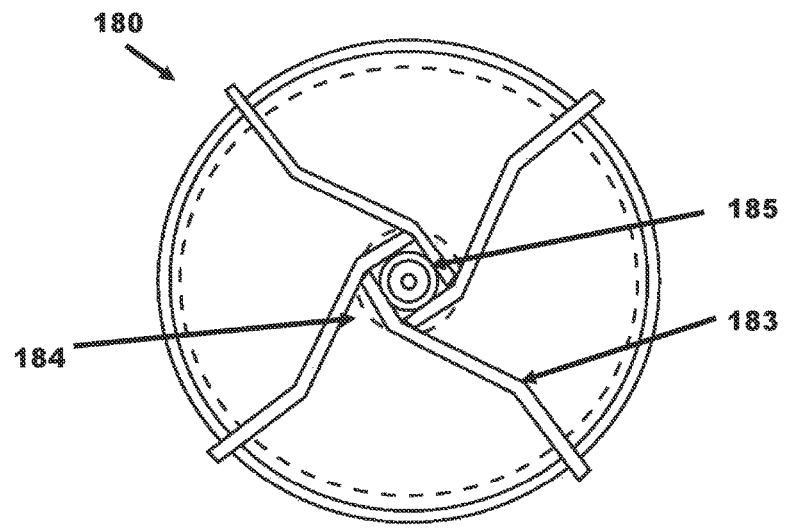
FIG. 14 is a elevation view of second ducted fan assembly of the aircraft of FIG. 1.

FIG. 14 is an elevation of 2nd Ducted fan unit 180. 2nd ducted fan unit 180 is configured the same way as 1st ducted fan unit 170. However, stator arms 183 do not extend very far out of duct 180 to attach to the sub frame. The same basic components are used. A bearing race 185 and housing 184 are used in the center for streamlining the air flow. Since the drive shaft is the center point in the unit the sub frame is bent to accommodate the difference in size.

Figure 15:
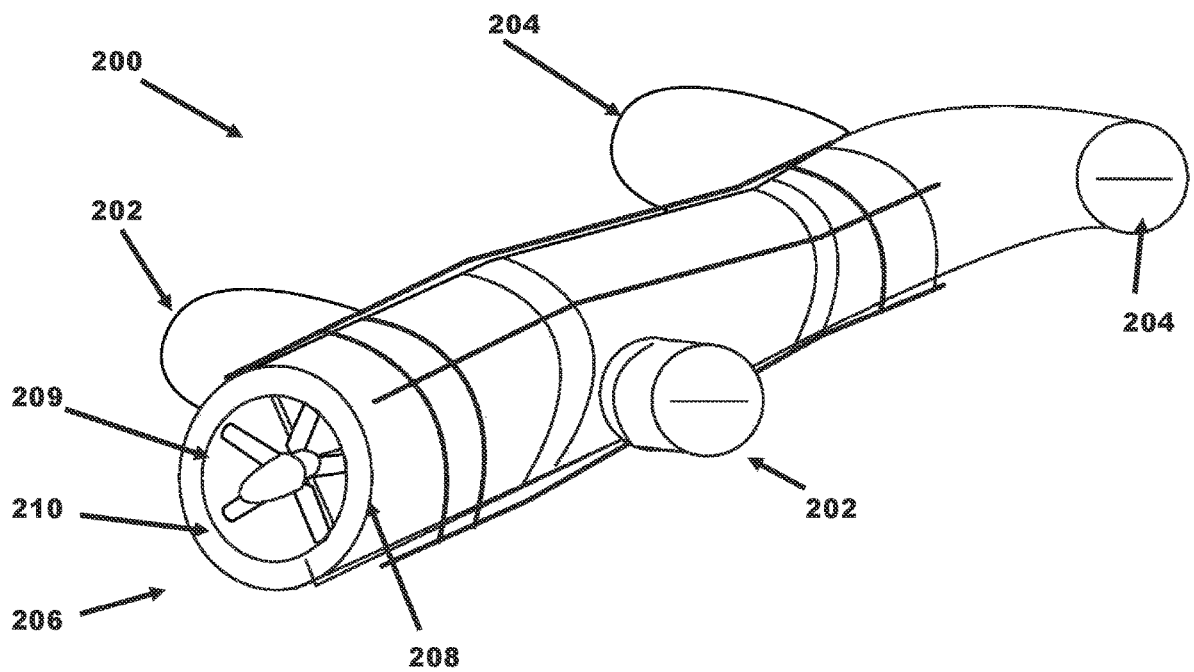
FIG. 15 is a perspective view of the compressor in the aircraft of FIG. 1.

FIG. 15 is a perspective view of sub frame 200 having front nozzle ports 202 and rear nozzle ports 204. Sub frame 200 has an intake end 206 wherein outer shell 208 is shown separated from inner shell 209 by gap 210.

Figure 16:
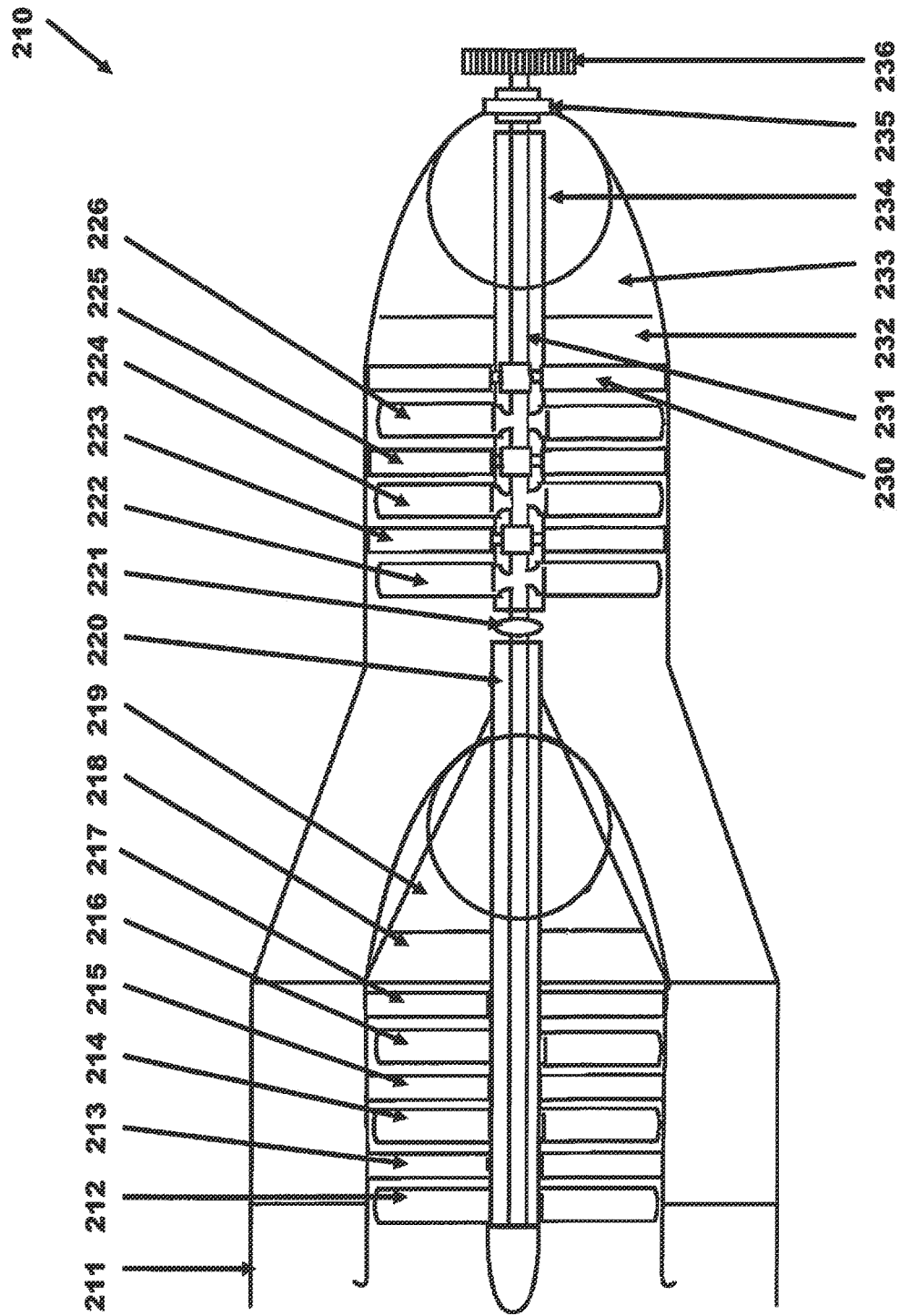
FIG. 16 is a plan view of the compressor assembly of the aircraft of FIG. 1.

FIG. 16 is a plan view of assembly 210. Assembly 210 has a ducted fan nested within a larger bypass duct 211 and a second fan behind the first. Both fans are attached to a drive shaft driven by an internal combustion engine. Each fan unit is made of three ducted fans. Each fan segment includes a fan 212, 214, 216, 222, 224, 226 attached to the drive shaft 231 and a stator 213, 215, 217, 223, 225, 230 with a bearing race to hold the drive shaft 231. At the exhaust end of the ducted fan is a flow divider assembly 219, 233 that splits the air and guides it toward the nozzle outlets. The divider has a fin 218, 232 at the separation point to guide the air to the nozzle outlets. Through the center of the casing; over the driveshaft is streamlining tube 220, 234. In between the fans connecting the drive shafts together is a u-joint coupler 221. At the tail end of the structure is a bearing race 235 to hold the drive shaft in position. On the end of the drive shaft is a sprocket 236. A wedge structure is behind the 1st duct divider 219 to guide the air flow to the 2nd duct fan unit. The ends of the 1st duct stator arms 276 are covered in sheet metal to streamline them within the outer duct. In the 1st duct fan unit at the front on the drive shaft is a nose cone to reduce drag going into the compressor.

Figure 17:
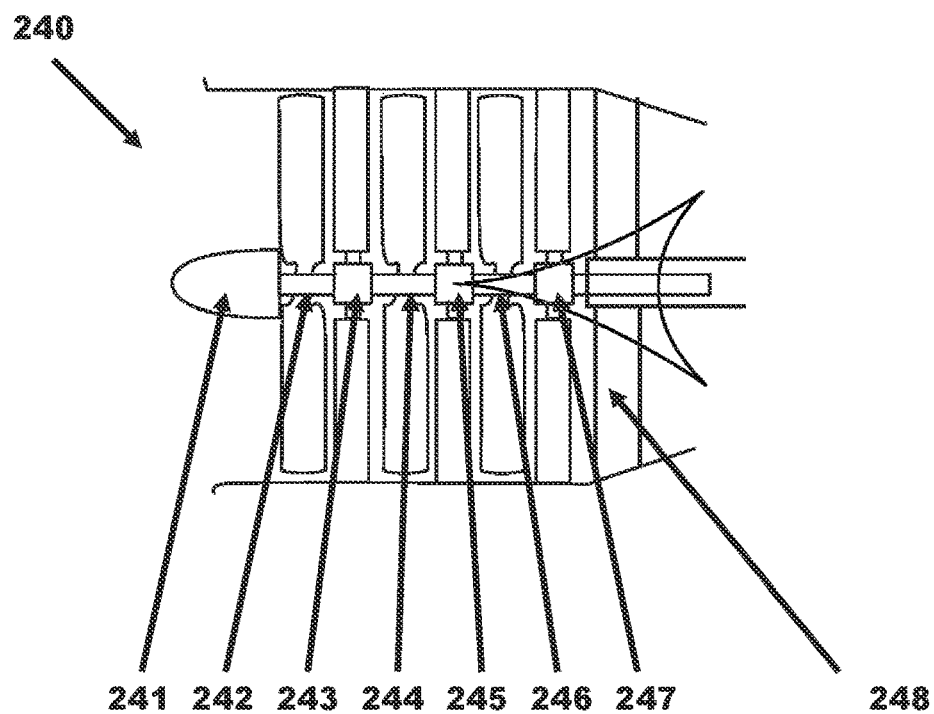
FIG. 17 is an elevation view of the duct fan assemblies of the aircraft of FIG. 1.

FIG. 17 is a schematic showing an anatomy of the duct fan unit 240. Each fan unit 240 is comprised of three fans and three stators. The very front of the first fan assembly is the nose cone 241 to reduce intake drag. The second fan unit does not have this due to it being under pressure and restricted by the casing. Mounted on the drive shaft is the first fan hub 242. The first fan is held in place by the stator bearing race 243. The second fan 244 is mounted to the drive shaft. Behind the second fan is the second stator bearing race 245. The third fan 246 is mounted to the drive shaft Behind third fan 246 is third stator bearing race 247. In the duct outlet is divider fin 248.

Figure 18:
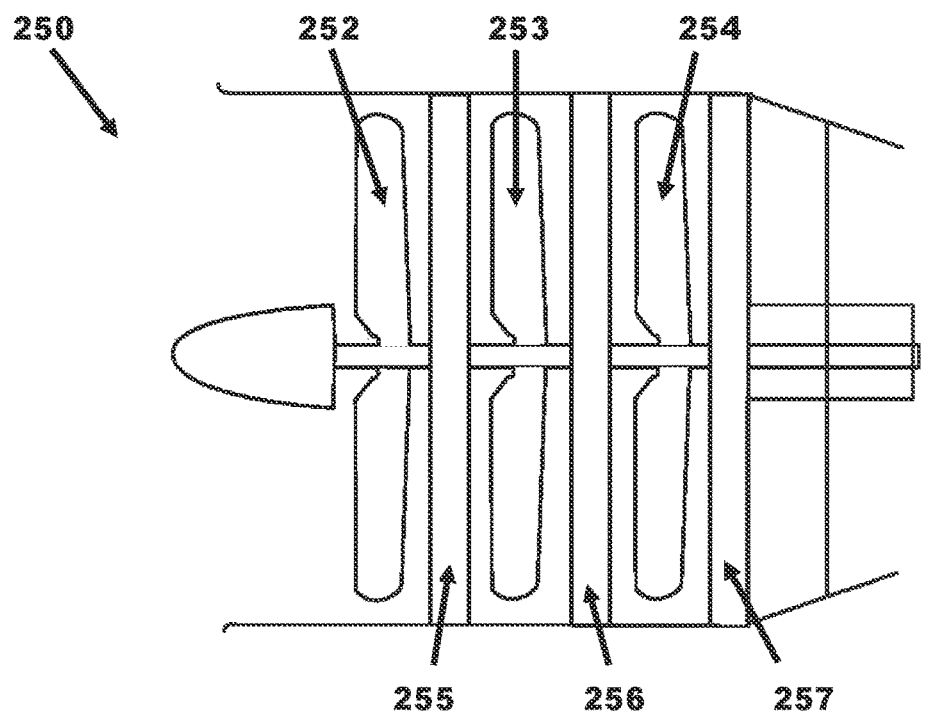
FIG. 18 is an exploded view of fan pitch angles of the aircraft in FIG. 1.

FIG. 18 is a perspective view of fan assemblies 250. Each fan is pitched at specific degree. As an example, first fan 252 is pitched is at 35 degrees. Second fan 253 is pitched at 40 degrees. Third fan 254 is pitched at 45 degrees. The pitch the fans are set such that each fan takes a larger bite at each successive stage to build up a dense air mass as the system runs. Stators 255, 256 and 257 can be seen between and following the fans 252, 253 and 254.

Figure 19:
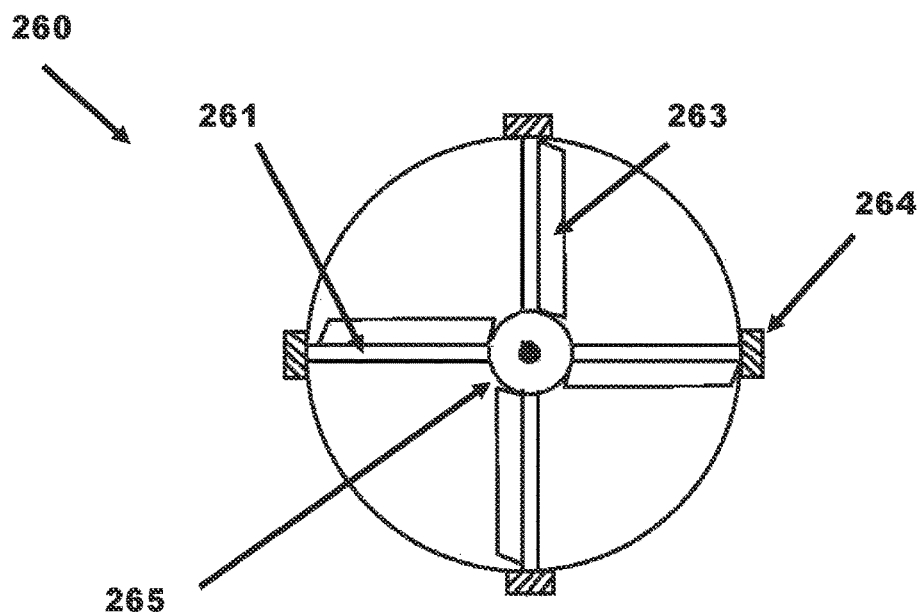
FIG. 19 is a plan view of the stator assembly of the aircraft of FIG. 1.

FIG. 19 is an elevation view of a stator assembly 260. Each stator arm has a lead edge formed like the front of a wing 261. Behind the front section of the stator arm is a small wing like structure 263. This wing is mounted to stator on a pivot and using a servo attached to the outside of the duct 264 can be moved into a position to angle the air flow from the fan in front of it to the direct bite of the fan behind it. The stator flaps are aligned to not contact or hinder the fan blades or the bearing race covers 265.

Figure 20:
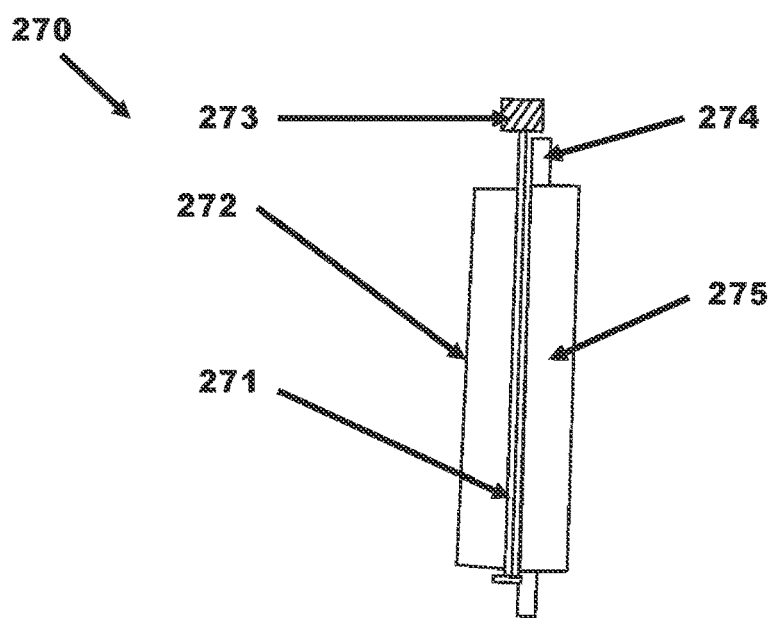
FIG. 20 is a plan view of the stator wing of the aircraft of FIG. 1.

FIG. 20 is an elevation view of stators 270. Stators 270 consist of 5 parts, i.e., stator arm 274, front wing curve structure 275, rear wing flap assembly 272. The pivot rod and arm mount 271, and servo 273 providing the movement.

Figure 21:
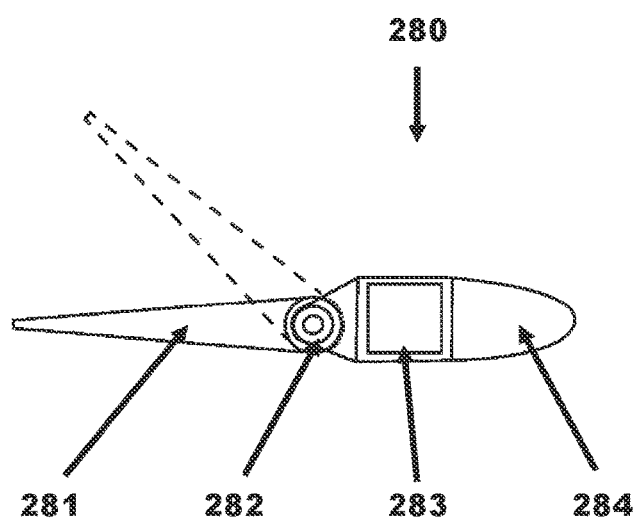
FIG. 21 is a plan view showing stator wing movement of aircraft of FIG. 1.

FIG. 21 is a top view of stator 280 shows the overall shape of the arms to be more like a wing. With the trailing edge 281 being able to move to the side of the arm in the airflow. This pivot is accomplished with shaft 282 extending along the arm that the wing is attached to directly. This component is mounted to back side of stator arm 283. The front side of the arm is enclosed with sheet metal to form a rounded wing lead edge shape 284.

Figure 22:
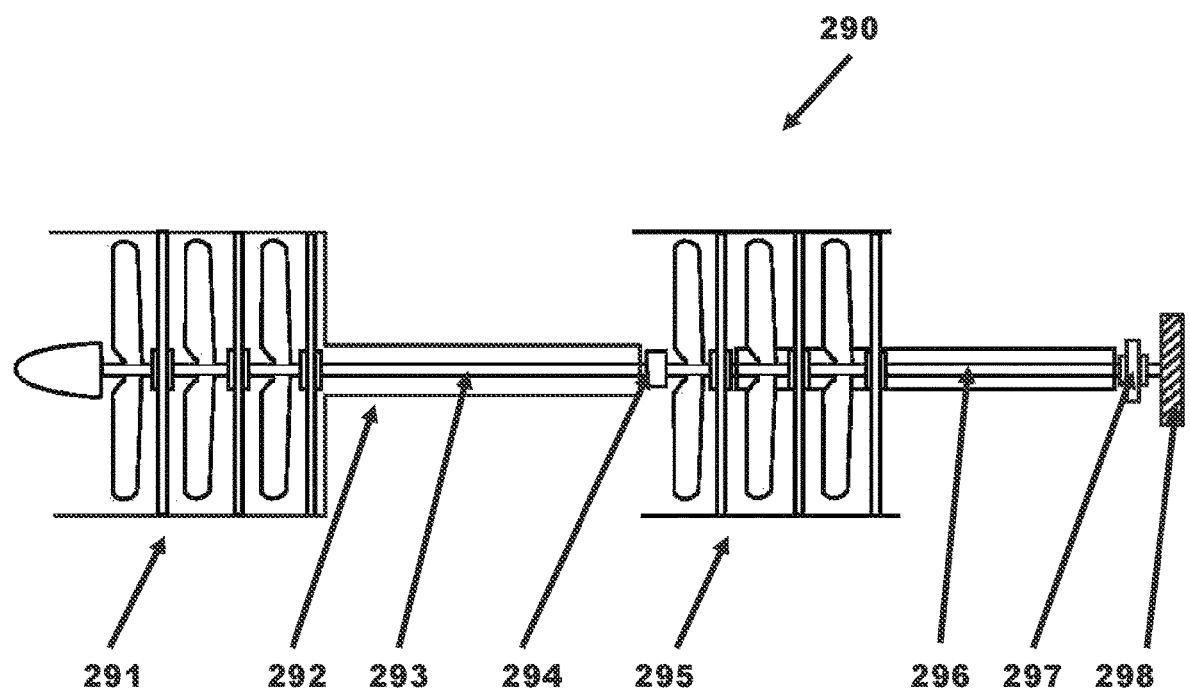
FIG. 22 is an elevation view of the drive train assembly of the aircraft of FIG. 1.

FIG. 22 is a plan view of drive train assembly 290. The drive train assembly 290 incorporates the use of drive shaft 293 to connect duct fan unit 291 to duct fan unit 295. The 1st fan unit drive shaft is connected by a u-joint assembly 294 to the 2nd fan unit driveshaft. The 2nd fan unit drive shaft 296 uses a sprocket 298 to connect to the engine by a chain. The 2nd fan unit drive shaft is held in place by a bearing race 297 mounted on the sub frame. The entire drive assembly is covered by tube 292.

Figure 23:
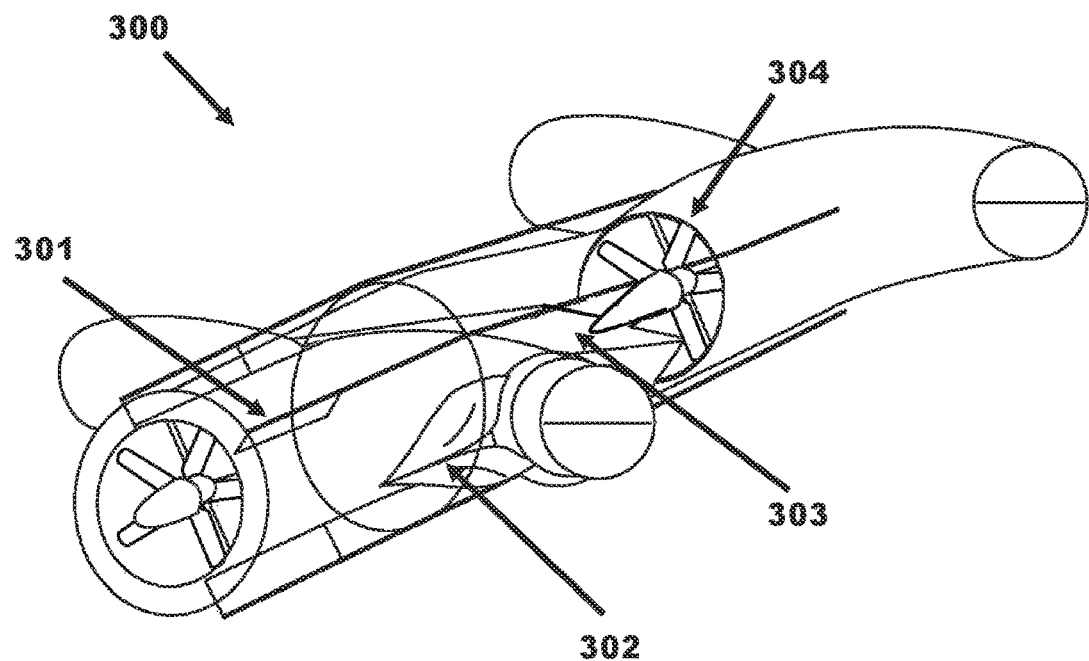
FIG. 23 is an exploded view of the second fan duct assembly and the internal air flow ramps in the aircraft of FIG. 1.

FIG. 23 is a perspective view of casing 300. Within casing 300 for the outer duct are features to streamline the air flow for second duct fan unit 304. These devices include strakes 301 at the front to cover the stator arms from the 1st duct fan unit. Intake ramps 302 direct the air over the duct arms of the 1st fan unit divider with minimal flow disturbance. Wedge shape 303 is provided to direct the airflow to 2nd fan unit 304 cleanly.

Figure 24:
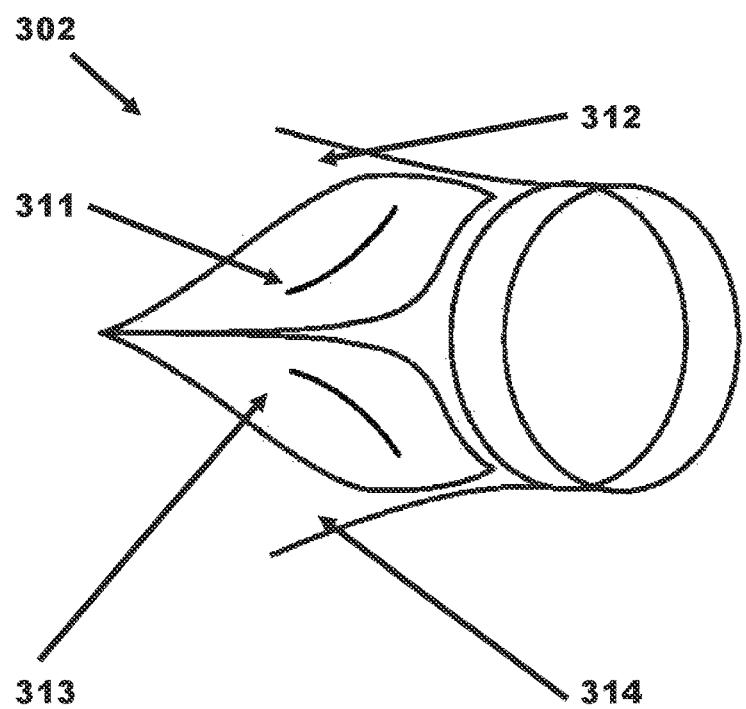
FIG. 24 is a perspective view of the intake ramps of the aircraft of FIG. 1.

FIG. 24 shows a perspective view of intake ramps 302 are two pieces of sheet metal bent and cut to fit within the casing and secured against the arms. One ramp 311 directs the oncoming air over nozzle arm 312 and the other ramp 313 directs the oncoming air under nozzle arm 314.

Figure 25:
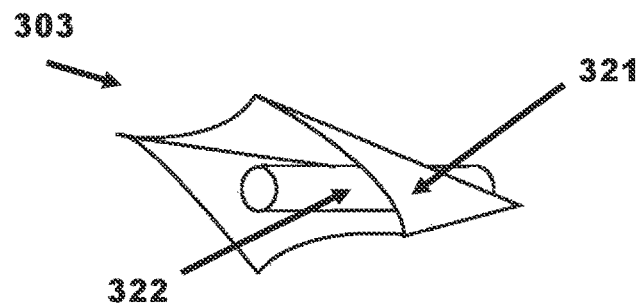
FIG. 25 is a perspective view of the wedge ramp of the aircraft of FIG. 1.

FIG. 25 shows wedge 303 is constructed from sheet metal and adheres to form with the 1st duct fan unit divider. This part is two pieces to form one structure 321. The inside is hollow but holds the drive shaft tube 322. The shape is taller flush against the divider and tapers down towards the mouth of the 2nd duct fan unit.

Figure 26:
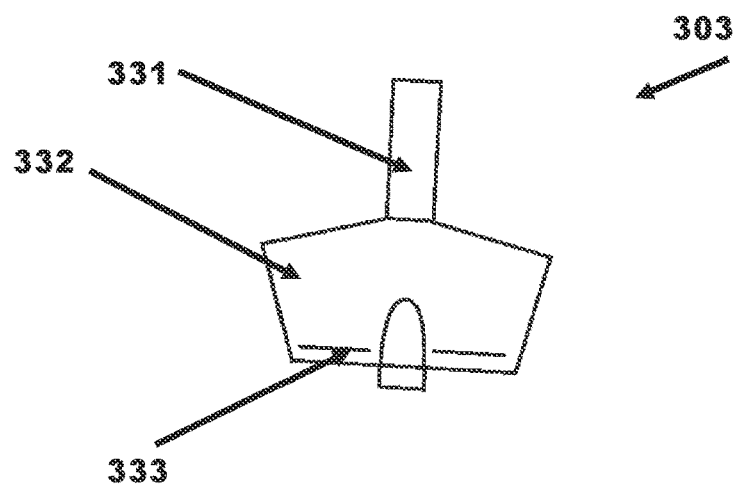
FIG. 26 is an elevation view of the wedge ramp assembly of the aircraft of FIG. 1.

FIG. 26 shows wedge 303. Wedge 303 has tapered segment 332 along the sides to conform to the shape of the casing. At the edge narrow edge the wedge comes to a point 333 in front of the 2nd fan. In the center is the drive shaft tube 331. Protruding from the tapered point is the tube covering the u-joint assembly.

Figure 27:
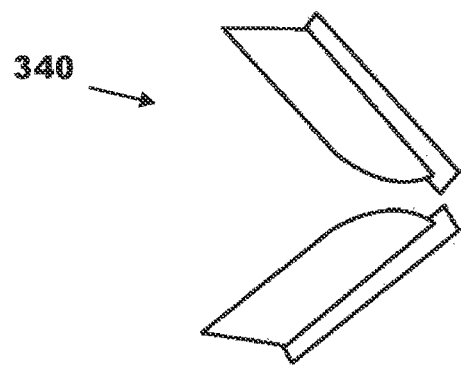
FIG. 27 is a plan view of the vortices generators within the compressor duct of the aircraft of FIG. 1.

FIG. 27 shows vortices generators 340. The shape and alignment of vortices generators 340 is vital to create a vacuum inside the divider section of the casing.

Figure 28:
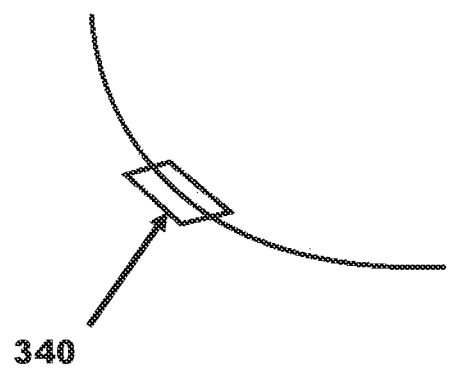
FIG. 28 is a plan view of vortices generators placement within the duct of the aircraft of FIG. 1.

FIG. 28 shows the positioning of vortices generators 350 on the inner duct divider section.

Figure 29:
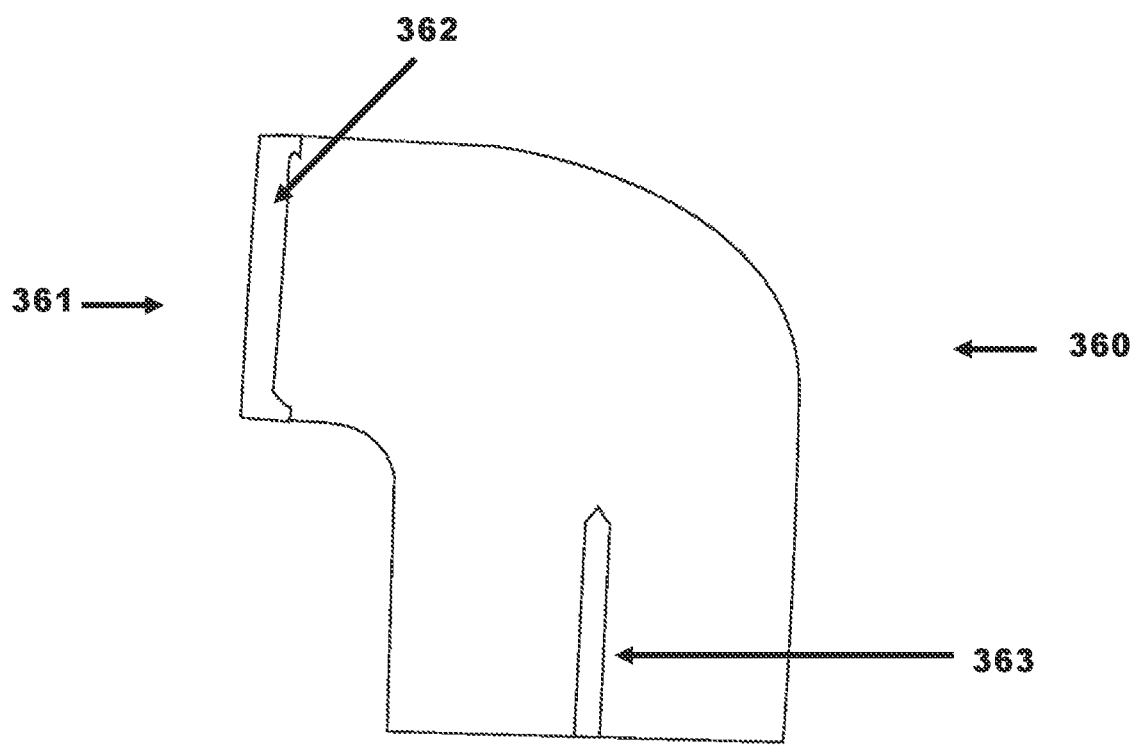
FIG. 29 is an elevation view of the thrust nozzle assembly of the aircraft of FIG. 1.

FIG. 29 shows nozzle 360. Nozzle 360 has three basic parts. Round open end 361 houses a bearing assembly permitting nozzle 360 to swivel forward and back to direct the thrust in a given direction. Bearing race 362 is preferably molded into the nozzle end. Nozzle 360 is designed to deflect the thrust in one direction. Once the thrust is in the chamber of nozzle 360, fin 363 divides the air mass before the air mass exits.

Figure 30:
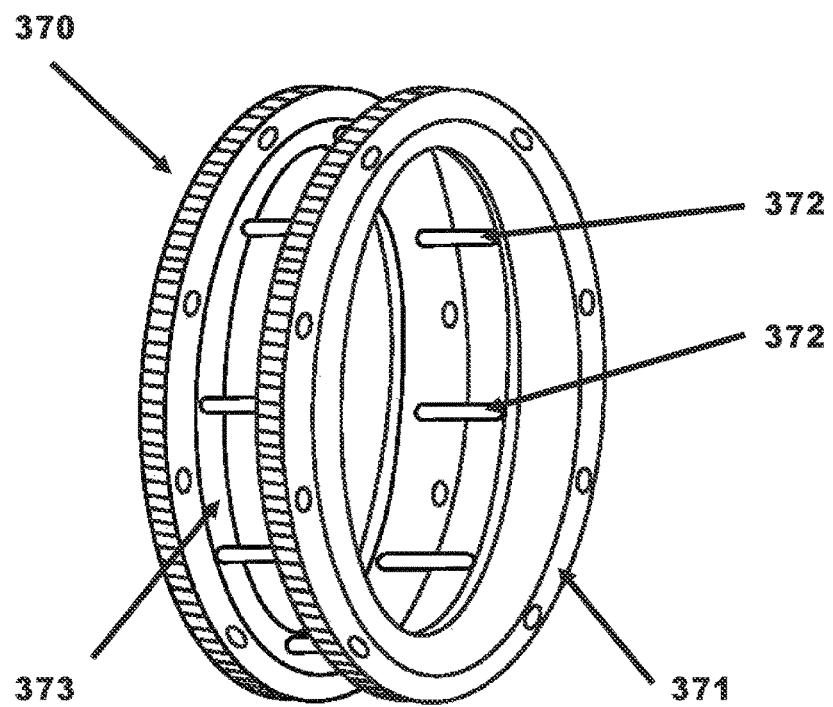
FIG. 30 is a perspective view of nozzle mount bearing rings in the aircraft of FIG. 1.

FIG. 30 shows bearing assembly 370. Bearing assembly 370 holds nozzle 360 on to aircraft 10 and provides rotational ability. Bearing assembly 370 has two large opening bearings. The bearings are held together by bolts 372 through outside bearing ring 371 and inside bearing ring 373. Nozzles 360 are mounted to outside bearing ring 371 of the bearings by small brackets and bolts. The bearings of inside bearing ring 373 accommodate mounting the assembly to a nozzle arm extension adjacent a nozzle port.

Figure 31:
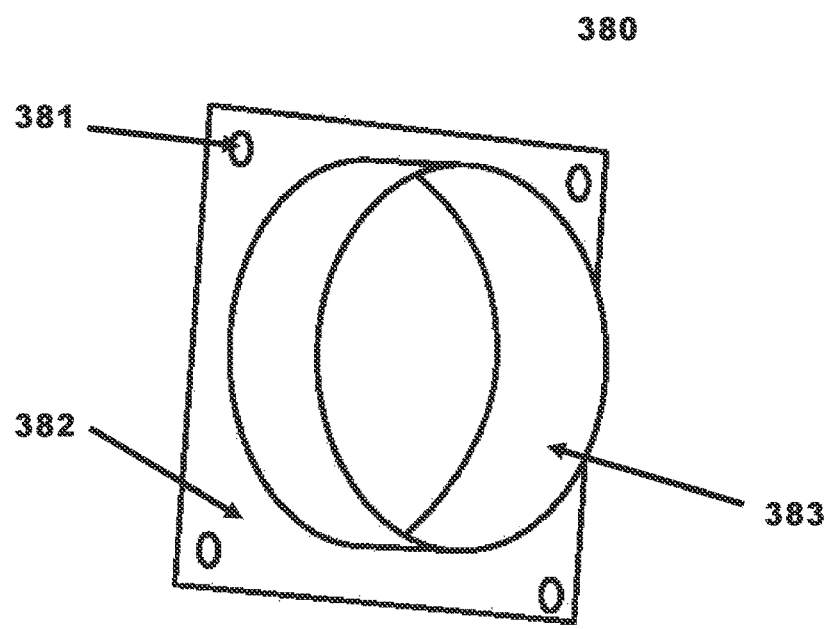
FIG. 31 is a perspective view of the nozzle mount to retain the nozzle to the aircraft of FIG. 1.

FIG. 31 shows a perspective view of nozzle arm extension 380. Nozzle arm extensions 380 mount directly over the outer portion of the nozzle arms at the nozzle ports and are a location to secure nozzle bearing assembly 370. Nozzle arm extensions 380 consist of a hollow cylinder to mount the nozzle bearings 383. A flat section perpendicular to the cylinder to mount the unit to the aircraft frame 382. Holes 381 in the flat section are to mount the unit to aircraft 10.

Figure 32:
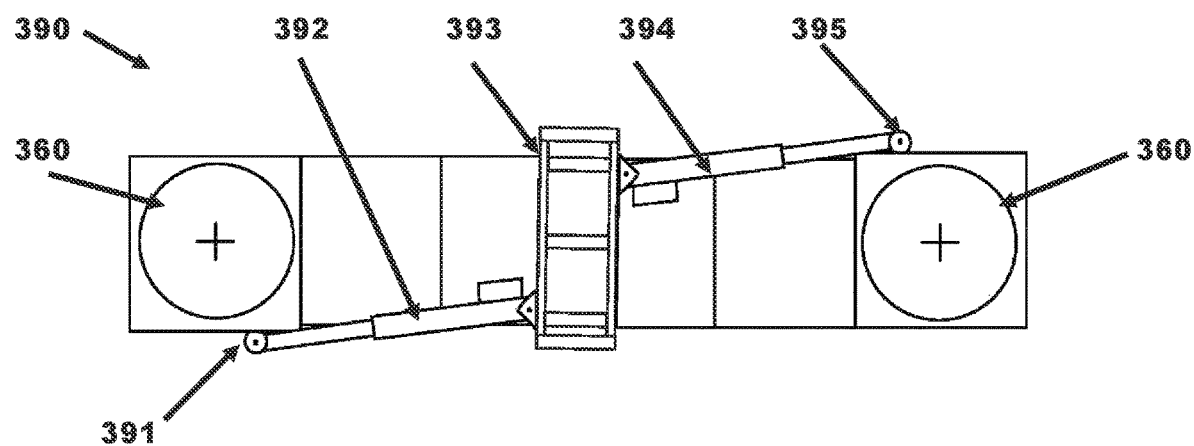
FIG. 32 is a elevation view of the nozzle actuators assembly of the aircraft of FIG. 1.

FIG. 32 shows nozzle actuators 390 are positioned for smooth and unbound movement and rotation. Nozzle arms 391, 395 connect the actuator arms to nozzles 360. The actuators 392, 394, are mounted at base end to the ladder 393. The actuators 392, 394 may be electric and receive input from single lever control in cockpit.

Figure 33:
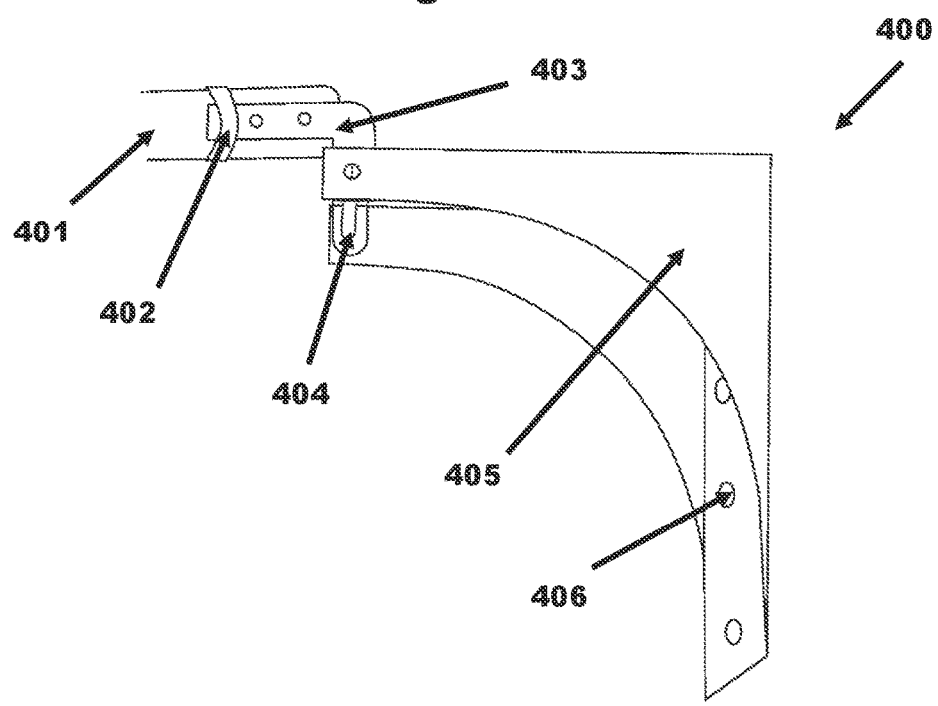
FIG. 33 is a perspective view of the nozzle actuator arm connection to the nozzle in the down position in the aircraft of FIG. 1.

FIG. 33 is a perspective view of nozzle control horn 400. Nozzle control horn is shown in a vertical position. Actuator arm 401 has a mounting on the end to connect with nozzle control horn 400. The end of the actuator arm has a finger 403 bolted to it with reinforcement ring 402. Nozzle control horn 400 is a bent metal plate with mounting holes on the bottom 406 to bolt it to a nozzle. Nozzle control horn 405 extends up over the nozzle giving clearance in either position to the actuator arm. The arm and the horn are connected to each other by a pin 404.

Figure 34:
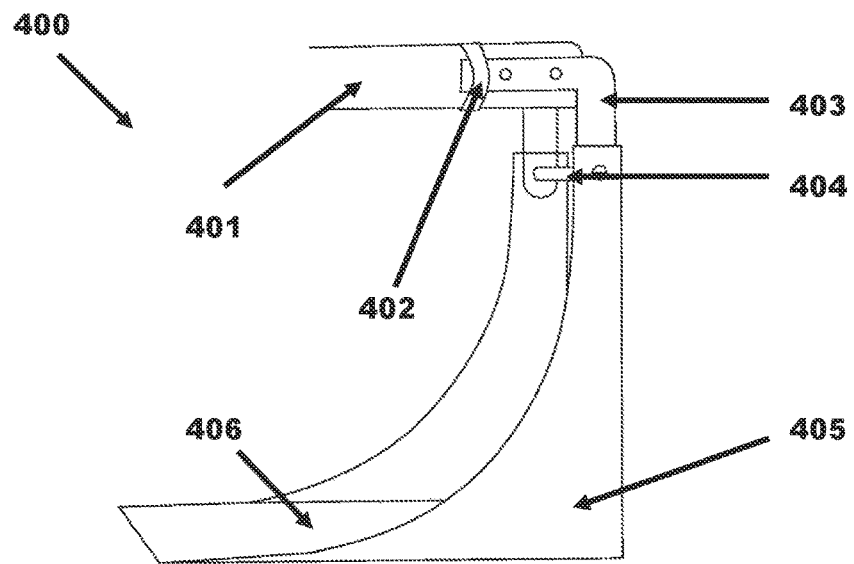
FIG. 34 is a perspective view of the nozzle actuator arm connection to the nozzle in the back position in the aircraft of FIG. 1.

FIG. 34 shows nozzle control horn 400 in forward flight position.

Figure 35:
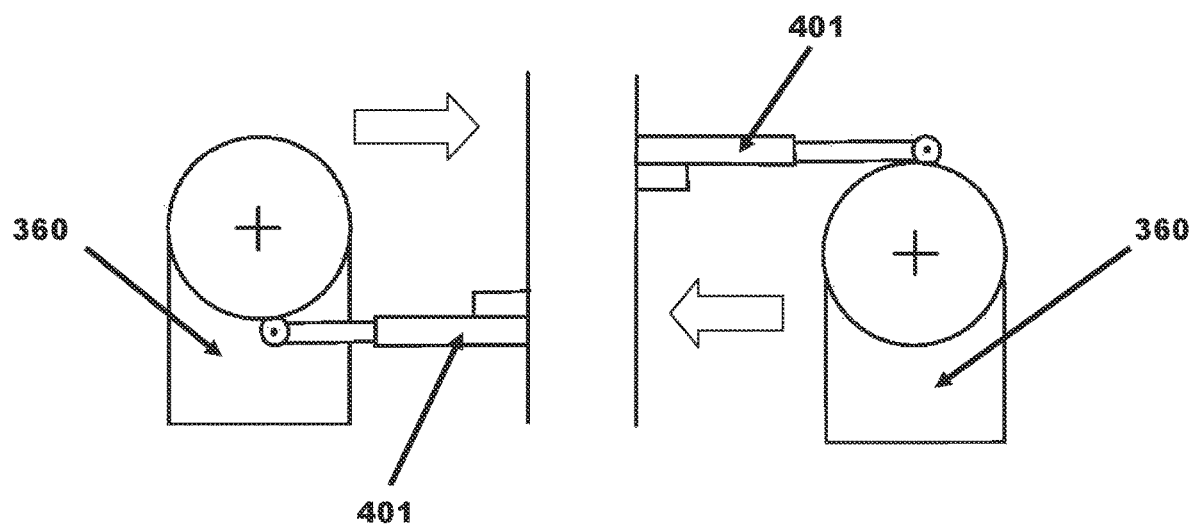
FIG. 35 is a perspective view of the nozzle actuator system pointed down in the aircraft of FIG. 1.

FIG. 35 is a schematic of nozzle actuator arms 401 that are mounted to the ladder assembly on the aircraft frame. When activated by the single lever control, actuator arms 401 extend or retract according to the input. With this set up the linear motion of actuator arms 401 is converted into rotary motion by the nozzle bearings. Retracting the actuator arms 401 positions the nozzles into the vertical position.

Figure 36:
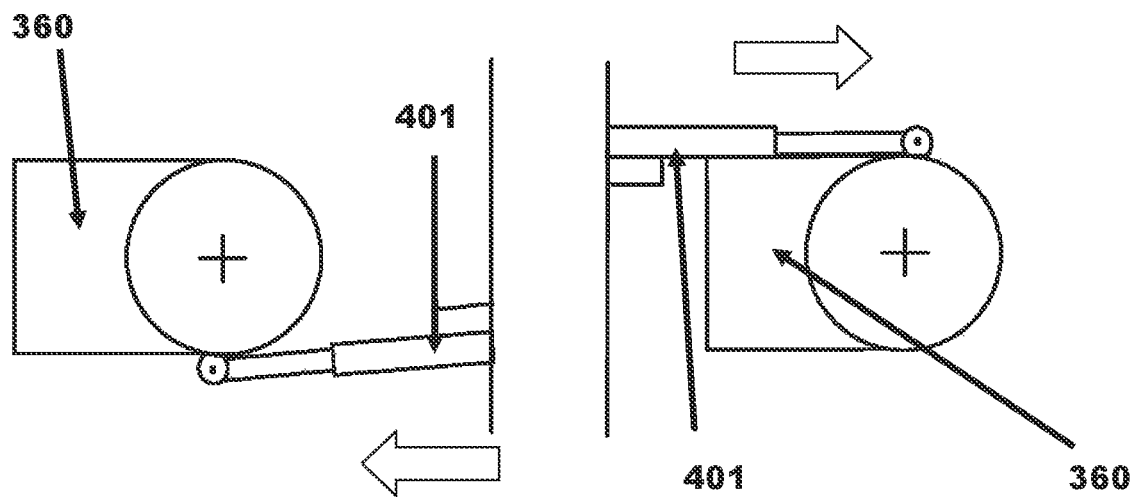
FIG. 36 is an elevation view of the nozzle actuator system in the back position in the aircraft of FIG. 1.

FIG. 36 shows nozzle actuators arms 401 in a forward flight position that may be actuated by pushing the single lever control forward.

Figure 37:
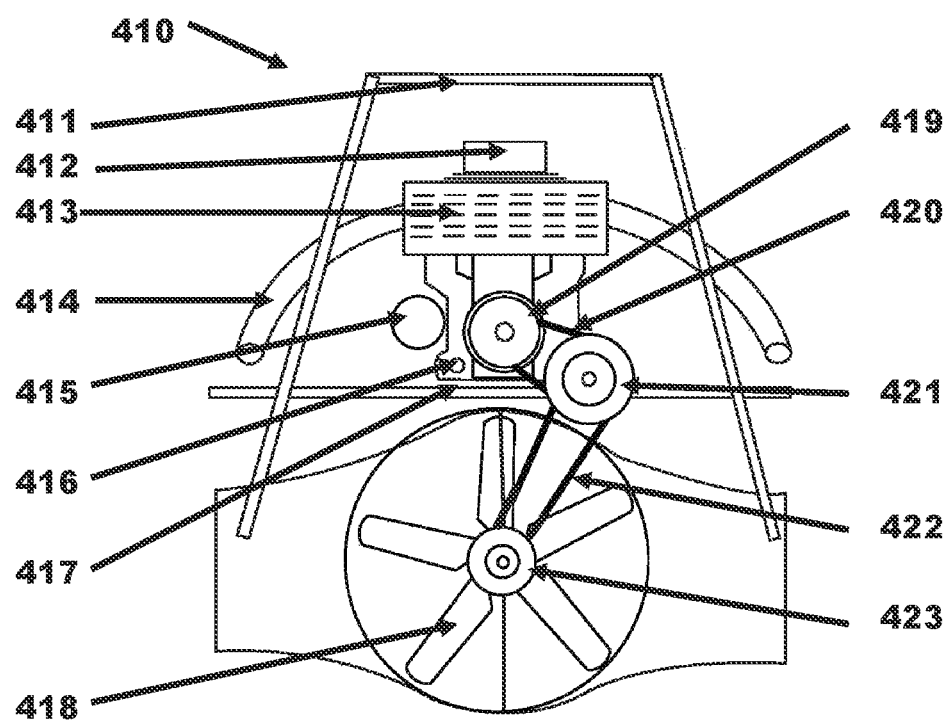
FIG. 37 is a elevated view of the engine bay, engine and transmission assembly in the aircraft of FIG. 1.

FIG. 37 shows an engine 410 for aircraft 10. Engine 410 is an internal combustion engine. This is a fuel powered device. The aircraft has an engine compartment behind the pilot. Engine 410 is mounted to the frame on an adjustable plate 417 to adapt the chain drive for reconfigurable drive assemblies. The engine bay is enclosed under the wings 411. At the top is the air intake 412. The muffler 413 is standard type with two exhaust pipes 414 extending out through holes in the rear wire mesh covers. The engine has an alternator 415 to generate electricity for the other sub systems. The engine has an electric starter 416. Engine 410 is coupled to a torque converter 419 as a transmission. Torque convertor 419 uses belt 420 to drive a spring loaded jack sprocket 421 to drive a chain 422 connected to the compressor input sprocket 423 coupled to the duct fans 418.

Figure 38:
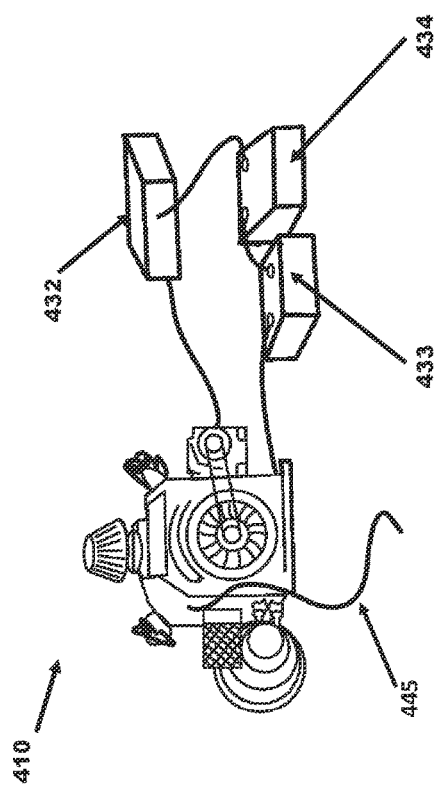
FIG. 38 is a schematic of the alternator and battery system in the aircraft of FIG. 1.

FIG. 38 shows engine 410 that uses an alternator to generate electricity to power the sub systems like the flight computer, hover controls, nozzle actuators, and navigation. To do this the aircraft has two batteries 433, 434 wired to the alternator with a system bus junction box 432 for distribution. This is the hybrid part of the system. The system is a close loop but can be recharged without removing the batteries.

Figure 39:
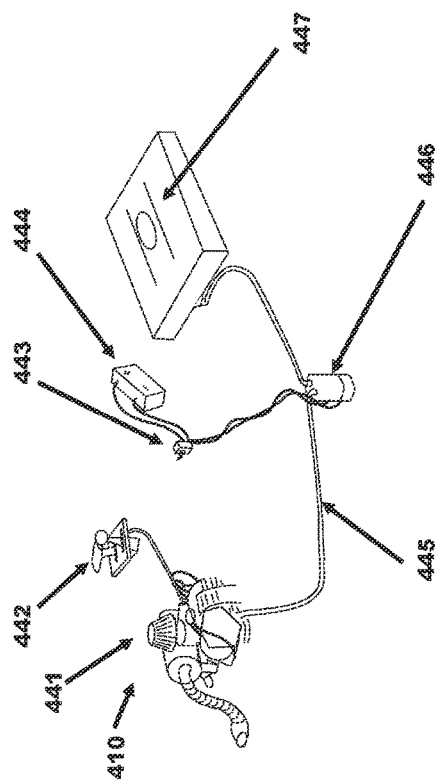
FIG. 39 is a schematic of the fuel system in the aircraft of FIG. 1.

FIG. 39 shows engine 410. Engine 410 operates on standard automotive fuels. The fuel system features the engine 410, a 5 gallon fuel tank 447 with an electric fuel pump 446 with an independent fuel pump switch 443 powered by the battery 444. A fuel line 445 with inline fuel filter connects the fuel tank to the engine carburetor 441. The engine rpm is controlled using a pull/push throttle lever 442 connected to the engine's throttle assembly by a cable.

Figure 40:
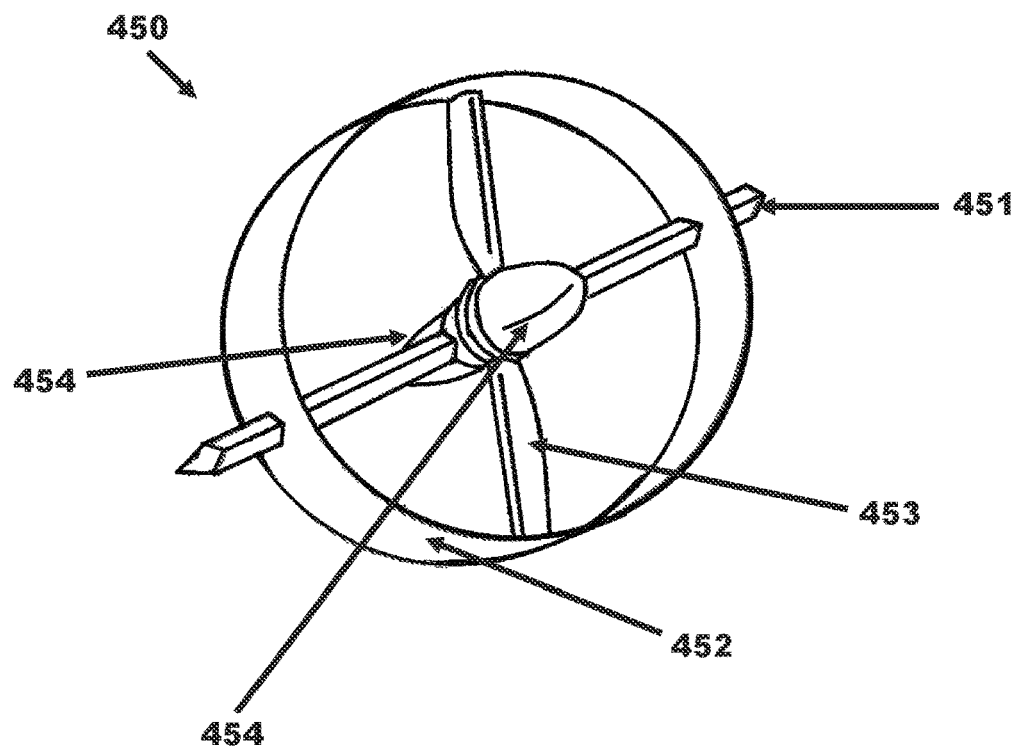
FIG. 40 is a perspective view of the hover control shrouded propeller on the aircraft of FIG. 1.

FIG. 40 shows shrouded propeller hover control system 450. Shrouded propeller hover control system 450 use a basic electric design for all four applications. The standard package includes mount 451, motor 454, propeller 453, nose cone 454, a shroud 452 and an electric speed controller. The basic package is adapted three ways to produce the performance desired. The system works by speeding up or slowing down the hover controls for a given action. Example 1: to pitch nose up the esc speeds up the front prop and slows the two in the wings to adjust attitude. The hover control system does not lift the aircraft so it is used by the flight computer to maintain a level and stable balanced condition.

Figure 41:
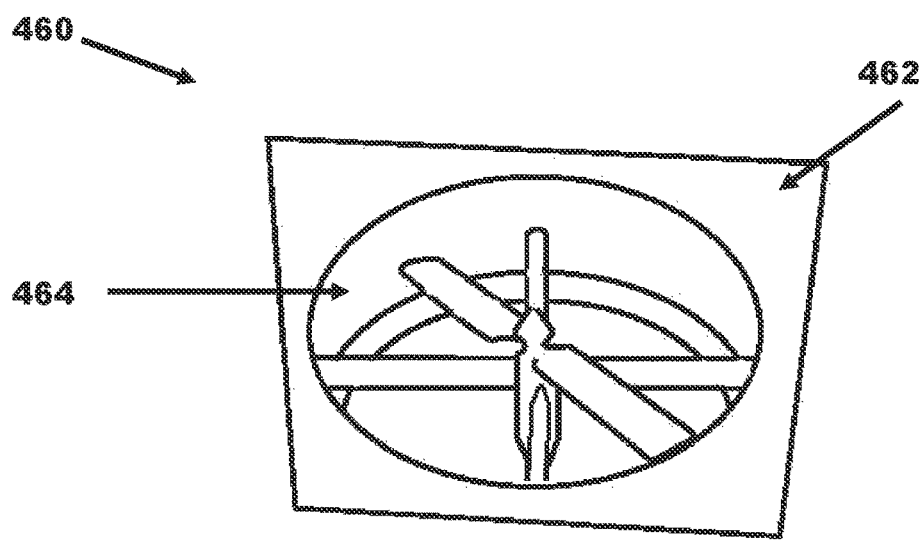
FIG. 41 is a perspective view of the front hover control shrouded propeller on the aircraft of FIG. 1.

FIG. 41 shows standard shrouded propeller 460 modified for the front hover control by adding a bell mouth intake lip 462 fitting for top of the nose assembly and an extended duct 464 to protrude below the aircraft nose.

Figure 42:
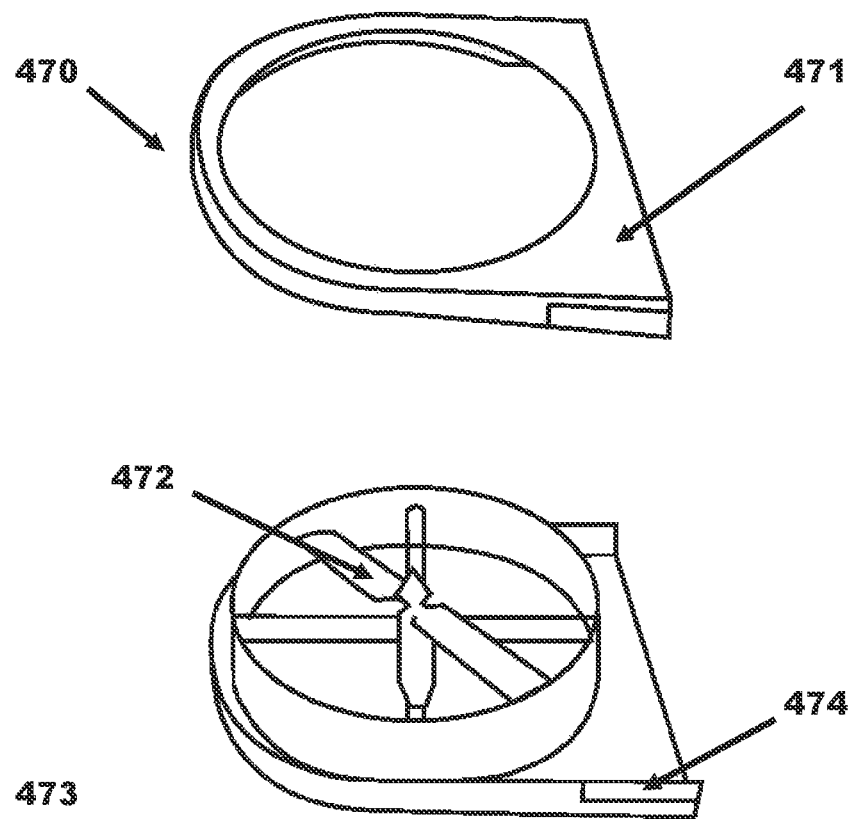
FIG. 42 is an exploded view of the wing tip hover control system on the aircraft of the FIG. 1.

FIG. 42 shows main wing shrouded propeller hover controls are the standard design 470. They are housed in a clam shell type enclosure. The two piece shell includes a top section 471. The shrouded propeller 472 sits in the bottom section 473. A flat spot is cast into the sections to accommodate a light 474.

Figure 43:
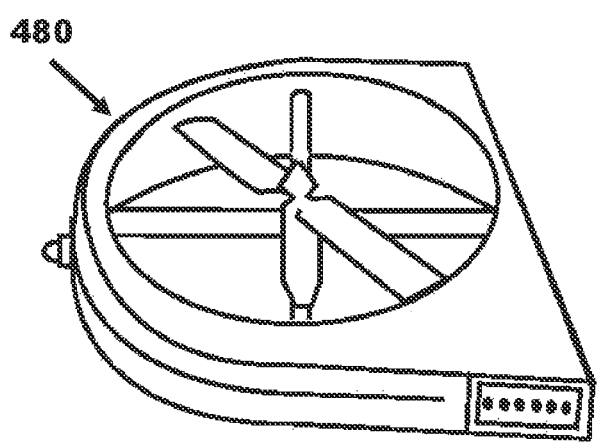
FIG. 43 is a perspective view of the starboard side wing tip hover control shrouded propeller on the aircraft of FIG. 1.

FIG. 43 shows a starboard unit 480. Starboard unit 480 has navigation light on the far outer edge and a head lamp on the front.

Figure 44:
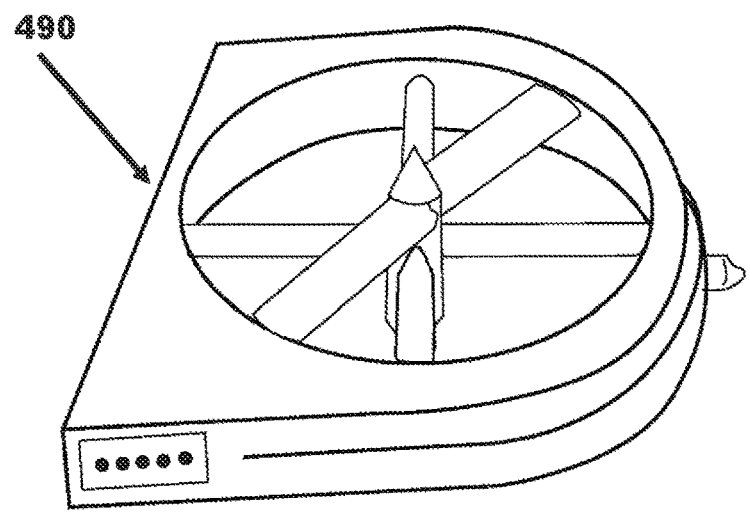
FIG. 44 is a perspective view of the port side wing tip hover control shrouded propeller on the aircraft of FIG. 1.

FIG. 44 shows a port unit 490. The port unit 490 has navigation light on the far outer edge and a head lamp on the front.

Figure 45:
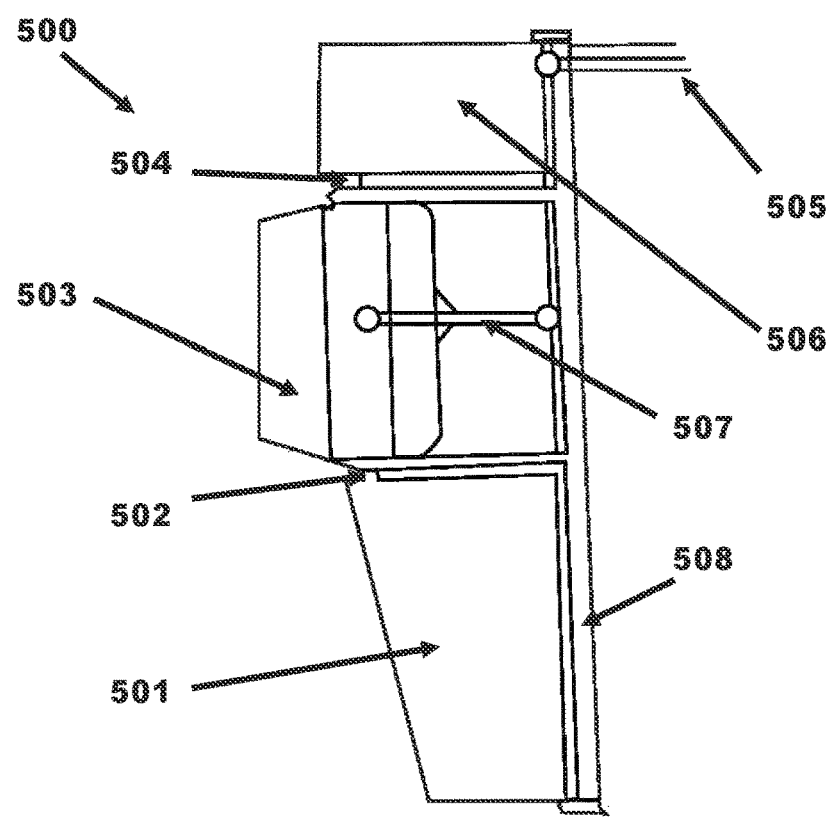
FIG. 45 is an elevated view of the rudder assembly of the aircraft of FIG. 1.

FIG. 45 shows a rudder 500. Rudder component 500 is a self-contained system. Rudder 500 is a combination of conventional design and the integration of a moveable shrouded propeller. The main operation is through the use of an actuator 505 to control movement to left or right. Actuator 505 is connected to a pivoting shaft mounted a vertical bar of the frame 508. Rudder flap 501 is attached to this pivoting shaft. The shaft is held in place by a mount on the top and bottom and retained running through the two mounting arms attached to frame 508. At the top is a solid strake 506. The shrouded propeller is mounted to aircraft by the mounting arms which extend out toward the aft of aircraft 10. On the ends of the arms are swivel mounts to hold the shrouded propeller 502, 504. The rudder shroud 503 is longer than the others and has accommodations to mount control arms 507.

Figure 46:
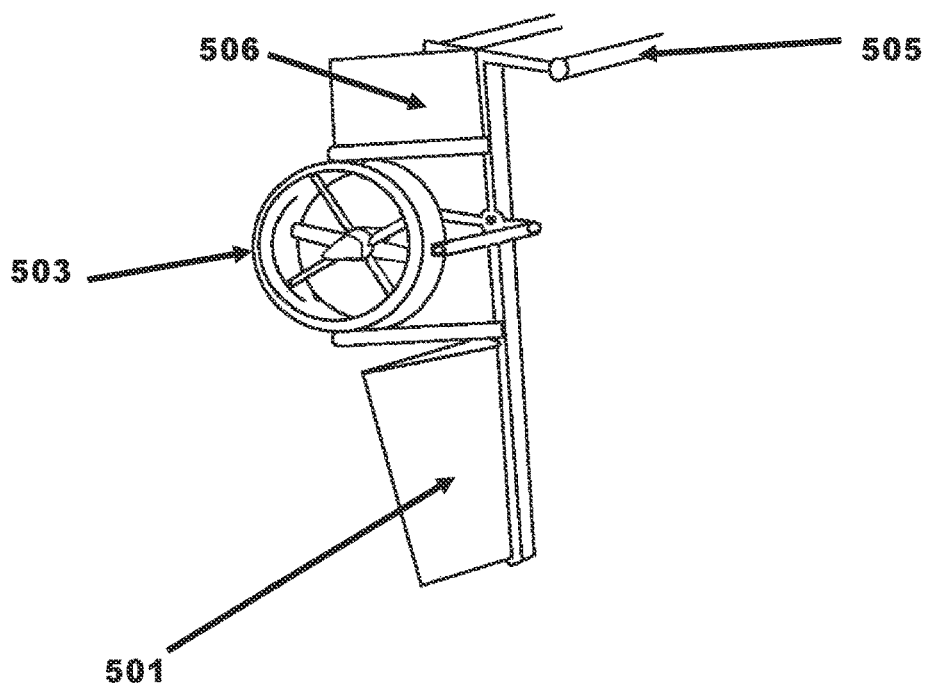
FIG. 46 is a perspective view of the rudder assembly of the aircraft of FIG. 1.

FIG. 46 is a perspective view showing a drawing of the rudder assembly.

Figure 47:
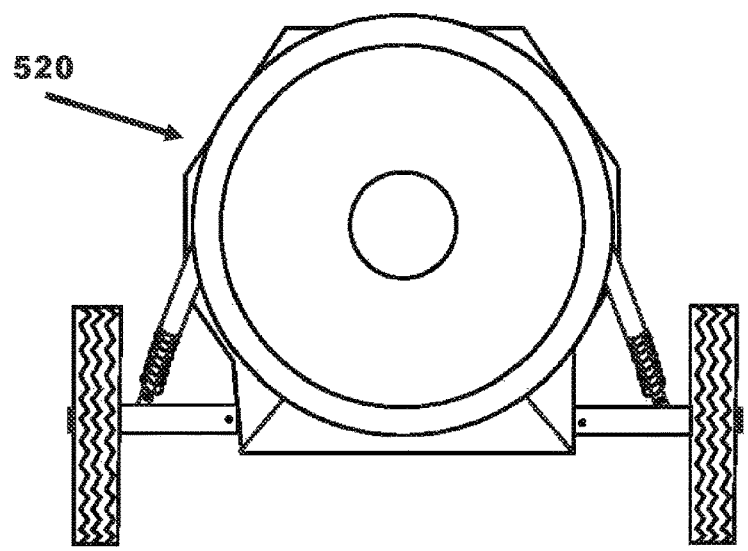
FIG. 47 is an elevation view of the front landing gear on the aircraft of FIG. 1.

FIG. 47 is an elevation view of the front landing gear 520 and relevant position to the aircraft.

Figure 48:
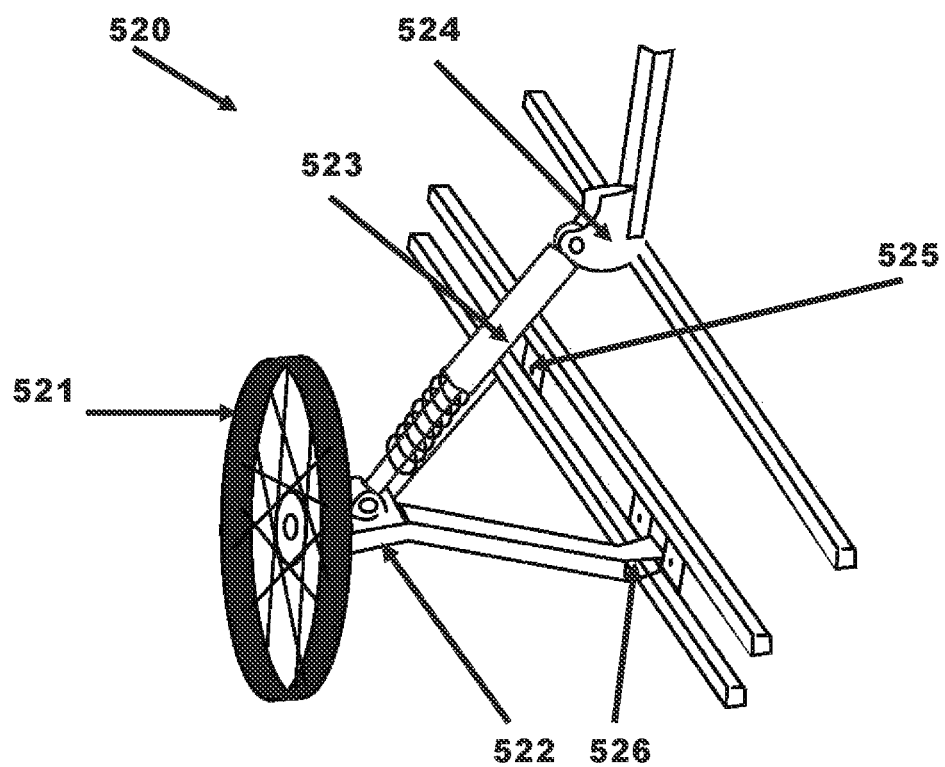
FIG. 48 is a perspective view of the front landing gear of the aircraft of FIG. 1.

FIG. 48 shows how front landing gear 520 incorporates a wheel 521 mounted to an axel bracket. The axel bracket has a hinge 522 on top to receive a shock absorber 523. The axel bracket is mounted to an A-frame structure which is hinged to the aircraft frame at hinge points 525, 526. The top of the shock is hinged to the frame at hinge point 524

Figure 49:
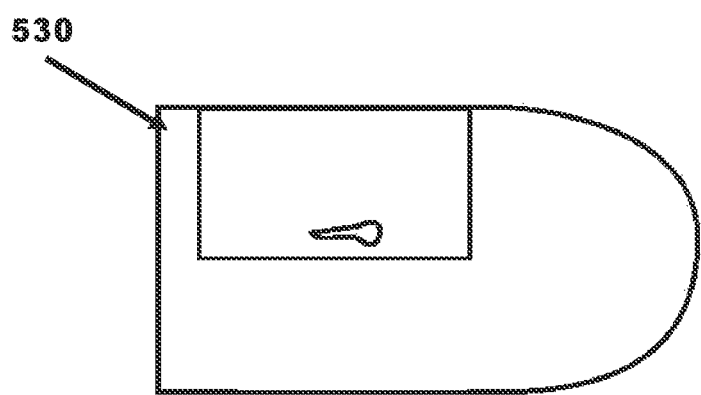
FIG. 49 is an elevation view of the front saddle bags on the aircraft of FIG. 1.

FIG. 49 is an elevation view of front saddle bags 530.

Figure 50:
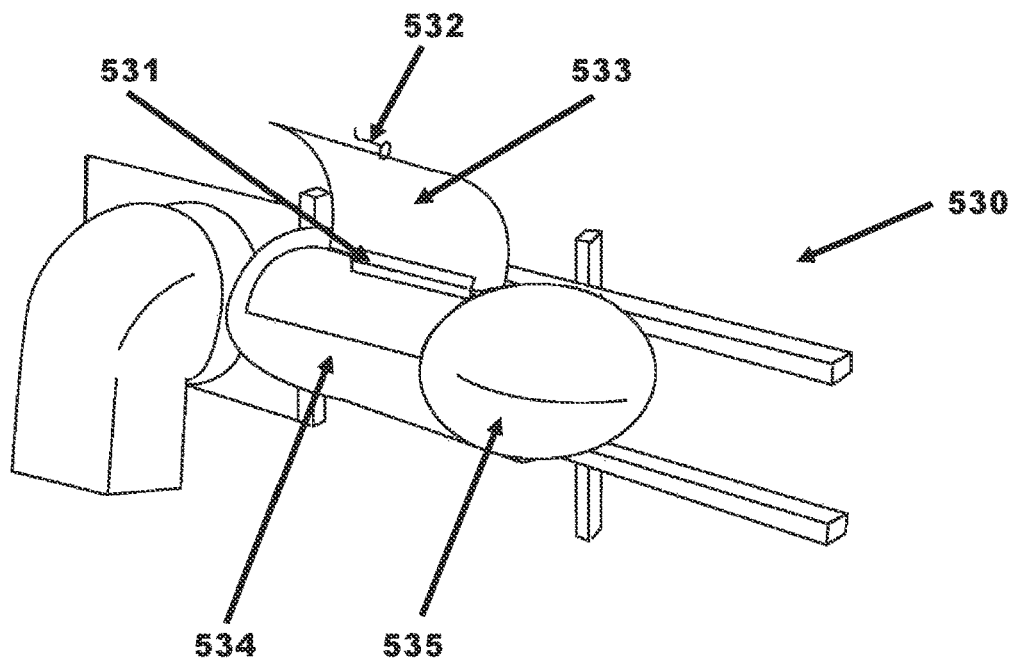
FIG. 50 is a perspective view of the front saddle bags on the aircraft of FIG. 1.

FIG. 50 shows how front saddle bags 530 include container 534 having a domed front 535. It is attached to the frame with bolts. Saddle bags 530 have a lid 533 mounted with hinge 531. Lid 533 is provided with latch handle 532.

Figure 51:
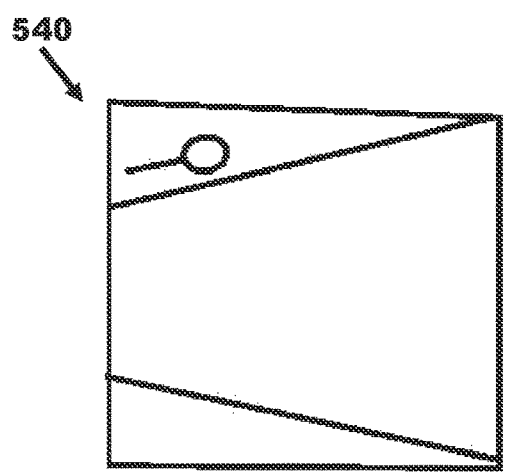
FIG. 51 is an elevation view of the rear saddle bags on the aircraft of FIG. 1.

FIG. 51 is an elevation view of rear saddle bags 540. Rear saddle bags 540 are designed to push the thrust from the front nozzles out to the sides of the aircraft like a fairing.

Figure 52:
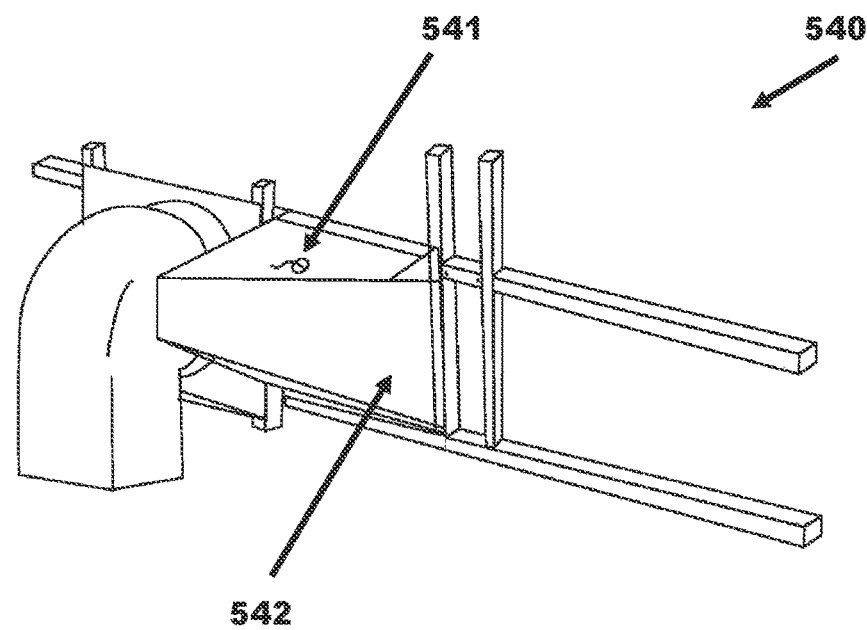
FIG. 52 is a perspective view of the front saddle bags on the aircraft of FIG. 1.

FIG. 52 is a perspective view of rear saddle bags 540 or a container mounted to the frame and the boarding ladder 542. Rear saddle bags 540 have a lid with a latching handle 541.

Figure 53:
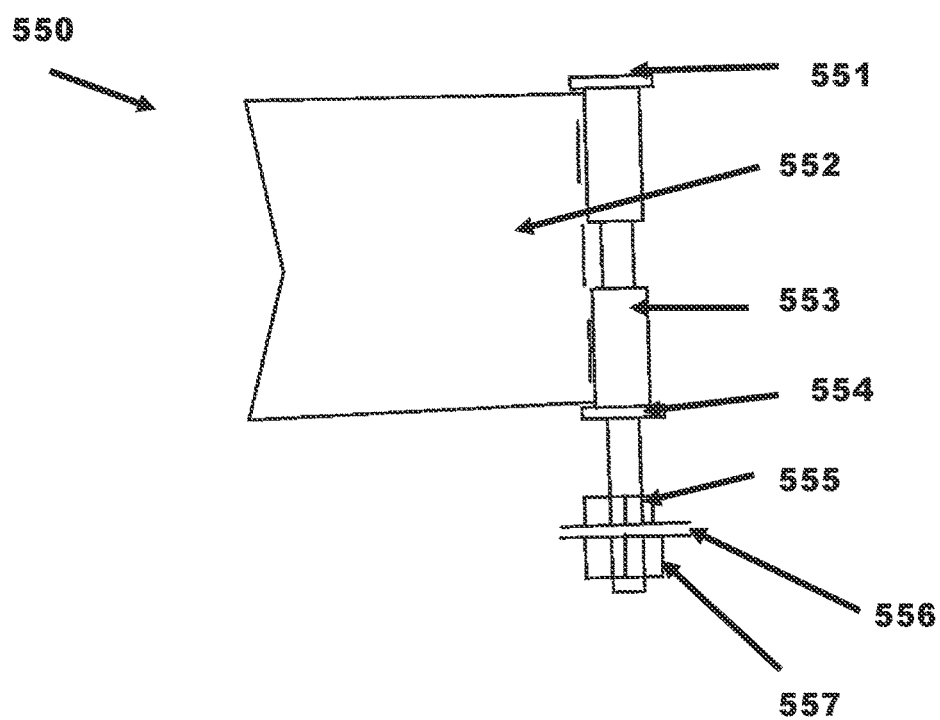
FIG. 53 is an elevation view of the wind direction indicator flag on the aircraft of FIG. 1.

FIG. 53 is a perspective view of wind vane 550. To assist the pilot in navigating hover maneuvers wind vane 550 is mounted to a top front of the fuselage where it can be seen. Wind vane 550 is used to determine from which direction the wind is striking aircraft 10. Wind vane 550 is constructed using cap 515 on top. Flag 552 swivels on a threaded shaft bolted into the frame of the aircraft 556 retained with nuts 555, 557. Flag 552 has a tube 553 on one end from which it is retained on the shaft. A shoulder 554 is provided on the shaft to hold flag 552.

Figure 54:
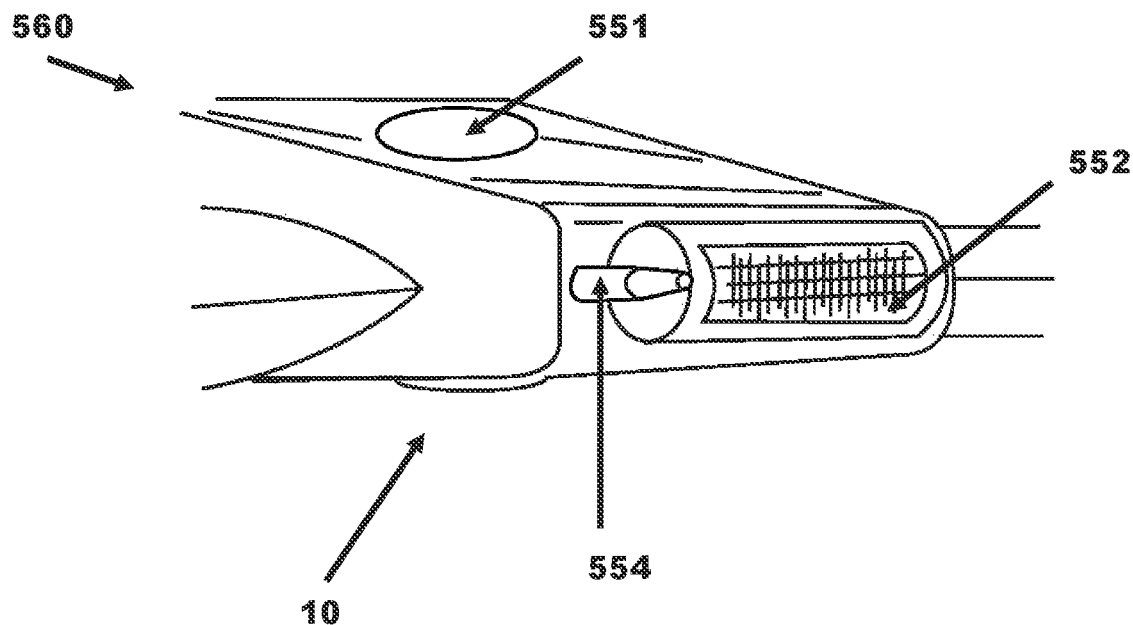
FIG. 54 is a perspective view of the pitot tube for onboard air speed indicator on the aircraft of FIG. 1.

FIG. 54 is a perspective view of a pitot tube air speed indicator 560. At the front of the nose of aircraft 10 is a pitot tube 554 for air speed indication. Pitot tube 554 is a next to front head light 552 in front of the front shrouded propeller 551. The placement of pitot tube 554 is to gain unrestricted airflow of accurate flight speed reading.

Figure 55:
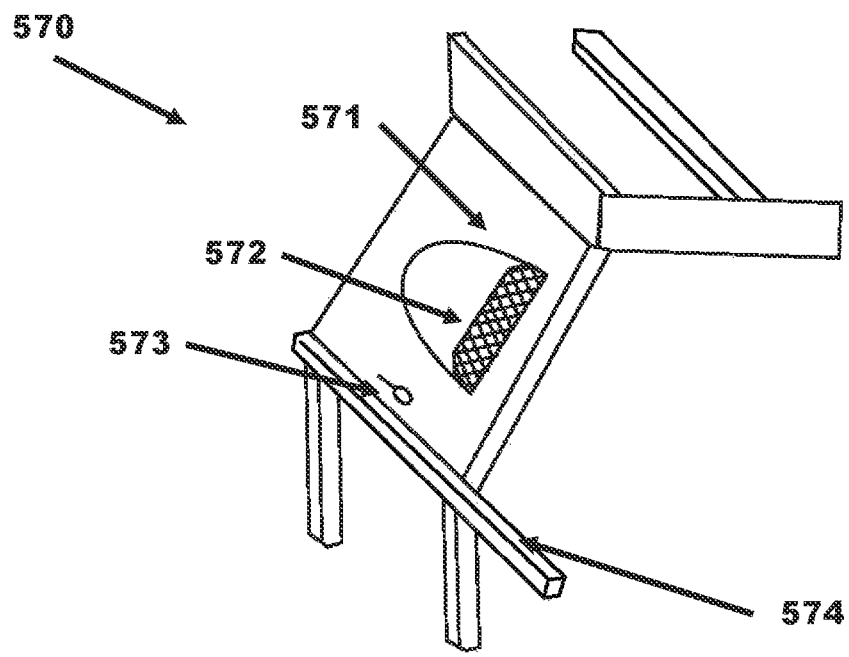
FIG. 55 is a perspective view of the engine intake cover with vent on the aircraft of FIG. 1.

FIG. 55 is a perspective view of the engine air intake assembly 570. The engine air intake assembly 570 is located at the back of the aircraft. Intake cowling 572 is mounted to a hinged door 571 with a latch handle 573. The door is mounted to the aircraft frame 574.

Figure 56:
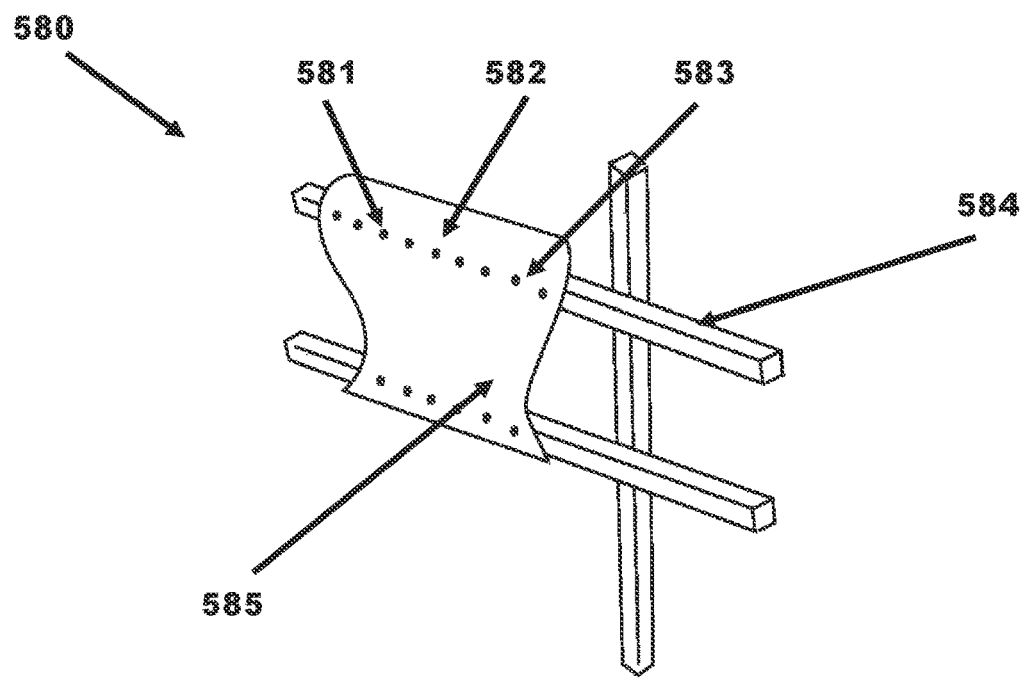
FIG. 56 is a perspective view of aircraft skinning techniques on the aircraft of the FIG. 1.

FIG. 56 is a perspective view showing the aircraft skin 580. The aircraft is skinned using sheet metal 585, sheet plastic 585 and fiberglass 585. The covering material is adhered to the frame 584 by screws 581, rivets 582 and bolts 583.

Figure 57:
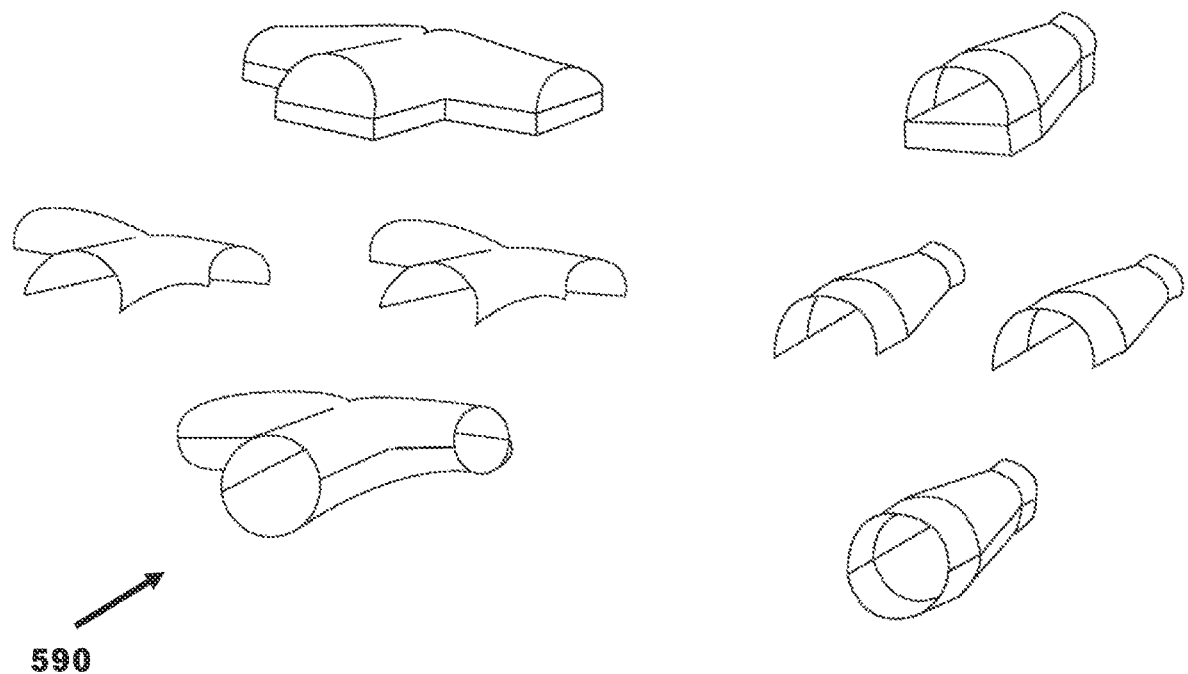
FIG. 57 is a perspective view of the compressor casing molding process of the aircraft of FIG. 1.

FIG. 57 is a perspective view of moldings 590 used for the molding process for the casing. The casing is manufactured using thermoplastic and molded using wood molds. The process lends itself to multiple castings to achieve two parts. The two parts can be fused together to form a single component.

Figure 58:
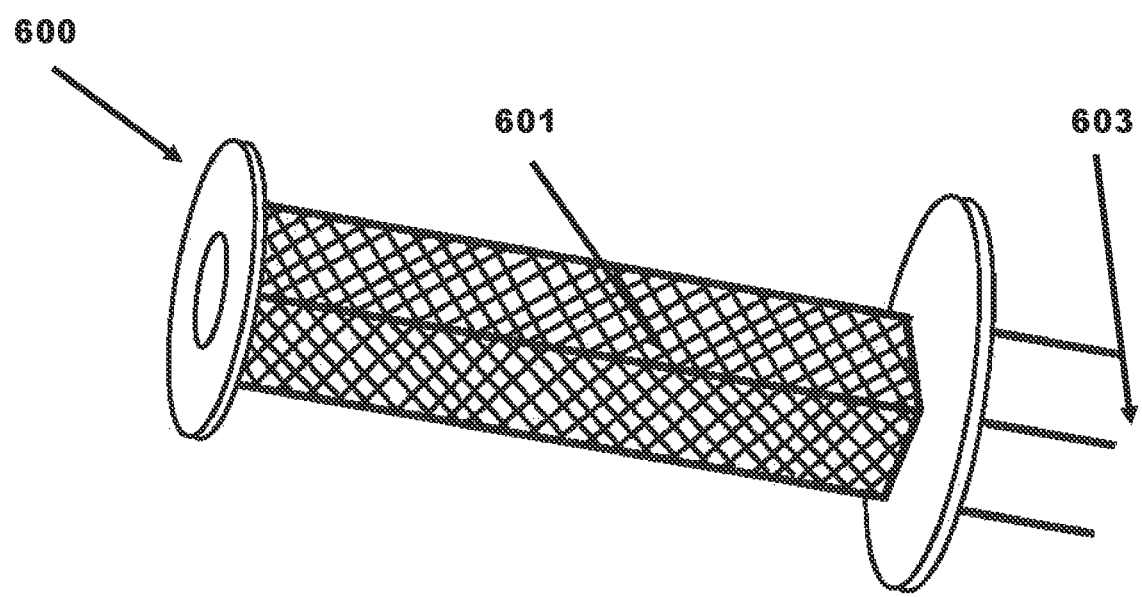
FIG. 58 is a perspective view of the hand grip on the aircraft of FIG. 1.

FIG. 58 is a perspective view of hand grips 600. To get on the aircraft and use the ladder a hand grip 600 is fashioned at the top of the dash on both sides of the cockpit. The hand grip is a handle bar grip 601 stretched over a portion of the frame 602.

FIG. 59A shows an elevation view of one embodiment of aircraft 10.

FIG. 59B shows a plan view of the aircraft of FIG. 59A.

FIG. 59C shows a rear view of the aircraft of FIG. 59A.

FIG. 59D shows an elevation view of the aircraft of FIG. 59A.

FIG. 59E shows a bottom view of the aircraft of FIG. 59A.

FIG. 59F shows a front view of the aircraft of FIG. 59A.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. An aircraft comprising:
   a frame assembly;
   a compressor supported by said frame assembly, said compressor having an outer shell having an intake end and an exhaust end, said outer shell defining a front nozzle port, said outer shell defining a rear nozzle port adjacent said exhaust end, sad compressor having an inner shell within said outer shell, said inner shell having an intake end and an exhaust end, said inner shell and said outer shell defining a gap therebetween, said gap defined by an annular space that completely surrounds said intake end of said inner shell;
   a first fan unit within said inner shell, said first fan unit proximate said intake end of said inner shell, said first fan unit configured to intake air through said intake end of said inner shell, said first fan unit configured to exhaust air through said front nozzle port;
   a second fan unit within said outer shell, said second fan unit proximate said exhaust end of said outer shell, said second fan unit configured to intake air through said gap between said inner shell and said outer shell, said second fan unit configured to exhaust air through said rear nozzle port;
   wherein a ramp and a wedge shaped platform is configured to streamline air flow to the second fan unit;

a front nozzle rotatably affixed adjacent said front nozzle port for selectively directing said exhaust air for either horizontal or vertical thrust;

a rear nozzle rotatably affixed adjacent said rear nozzle port for selectively directing said exhaust air for either horizontal or vertical thrust.

2. The aircraft according to claim 1 wherein:
said first fan unit and said second fan unit are connected to one another via a drive shaft driven by an engine that is operatively connected to said drive shaft via a torque converter.

3. The aircraft according to claim 1 wherein:
said first fan unit and said second fan unit are connected to one another via a drive shaft;
a streamlining tube surrounding said drive shaft.

4. The aircraft according to claim 1 wherein at least one of said first fan unit and said second fan unit comprises:
at least one fan surrounded by at least one of said outer shell or said inner shell, said fan driven by a drive shaft
a bearing race for supporting said drive shaft, said bearing race mounted in a bearing race cover;
a plurality of stator arms that connect said bearing race cover to at least one of said outer shell and said inner shell, said stator arms having a leading edge and a trailing edge;
a wing structure pivotally attached to said trailing edge of said stator arms for angling air flow.

5. The aircraft according to claim 1 wherein:
said front nozzle port is a first front nozzle port; and further comprising
a second front nozzle port; and further comprising
a flow divider assembly proximate an exhaust end of said first fan unit, said flow divider assembly having a fin at a separation point to split airflow and to guide airflow to said first front nozzle port and said second front nozzle port.

6. The aircraft according to claim 1 wherein:
said front nozzle is part of a front nozzle assembly having a first front nozzle and a second front nozzle;
a first nozzle actuator affixed to said first front nozzle and a second nozzle actuator affixed to said second front nozzle.

7. An aircraft comprising:
a frame assembly;
a compressor supported by said frame assembly, said compressor having an intake end and an exhaust end, said compressor defining a front nozzle port, sad compressor defining a rear nozzle port adjacent said exhaust end;
a first fan unit within said compressor, said first fan unit proximate said intake end of said compressor, said first fan unit receiving air intake through said intake end of said compressor, said first fan unit configured to exhaust air through said front nozzle port;
a second fan unit within said compressor, said second fan unit configured to intake air via a gap through said intake end of said compressor, said second fan unit configured to exhaust air though said rear nozzle port;

wherein a ramp and a wedge shaped platform is configured to streamline air flow to the second fan unit;
a drive shaft between said first fan unit and said second fan unit;
a bearing race for supporting said drive shaft, said bearing race mounted in a bearing rear cover;
a plurality of stator arms that connect a duct wall to said bearing race cover, said stator arms having a leading edge and a trailing edge, a wing structure pivotally attached to said trailing edge of said stator arms for angling air flow from said first fan unit to said second fan unit.

8. The aircraft according to claim 7 wherein:
said compressor has an inner shell within an outer shell, said outer shell having an intake end and an exhaust end, said inner shell having an intake end and an exhaust end, said inner shell and sad outer shell defining the gap therebetween that defines an annular space that completely surrounds said intake end of said inner shell;
said first fan unit within said inner shell, said first fan unit proximate said intake end of said inner shell, said first fan unit configured to intake air through said intake end of said inner shell, said first fan unit configured to exhaust air through said front nozzle port;
said second fan unit within said outer shell, said second fan unit proximate said exhaust end of said outer shell, said second fan unit configured to intake air through sad gap between said inner shell and said outer shell, said second fan unit configured to exhaust air through said rear nozzle port;
a front nozzle rotatably affixed adjacent said front nozzle port for selectively directing airflow for either horizontal or vertical thrust;
a rear nozzle rotatably affixed to sad rear nozzle port for selectively directing airflow for either horizontal or vertical thrust.

9. The aircraft according to claim 7 wherein:
said first fan unit and said second fan unit are connected to one another via a drive shaft.

10. The aircraft according to claim 9 further comprising:
a streamlining tube surrounding said drive shaft.

11. The aircraft according to claim 8 wherein:
said front nozzle port is a first front nozzle port; and further comprising
a second front nozzle port; and further comprising
a flow divider assembly proximate an exhaust end of said first fan unit, said flow divider assembly having a fin at a separation point to split airflow and to guide airflow to said first front nozzle port and said second front nozzle port.

12. The aircraft according to claim 7 further comprising:
a first front nozzle and a second front nozzle;
a first nozzle actuator affixed to said first front nozzle and a second nozzle actuator affixed to said second front nozzle.

* * * * *